(12) United States Patent
Kwemo

(10) Patent No.: US 10,047,975 B2
(45) Date of Patent: Aug. 14, 2018

(54) SYSTEM AND METHOD FOR THERMAL RESPONSE TESTING

(71) Applicant: ENERGIE-STAT INC., Montreal (CA)

(72) Inventor: Patrice Kwemo, Montreal (CA)

(73) Assignee: ÉNERGIE-STAT INC., Montreal, QC (CA)

( * ) Notice: Subject to any disclaimer, the term of this patent is extended or adjusted under 35 U.S.C. 154(b) by 1036 days.

(21) Appl. No.: 14/226,439

(22) Filed: Mar. 26, 2014

(65) Prior Publication Data

US 2014/0297216 A1 Oct. 2, 2014

Related U.S. Application Data

(60) Provisional application No. 61/805,354, filed on Mar. 26, 2013.

(51) Int. Cl.
*G01N 25/18* (2006.01)
*F24J 3/08* (2006.01)

(52) U.S. Cl.
CPC ............ *F24J 3/083* (2013.01); *F24J 2200/06* (2013.01); *Y02E 10/125* (2013.01)

(58) Field of Classification Search
CPC ...... F24J 3/083; F24J 2200/06; Y02E 10/125; G05B 15/00; G01N 25/18
See application file for complete search history.

(56) References Cited

U.S. PATENT DOCUMENTS

| 8,005,640 B2 | 8/2011 | Chiefetz et al. | |
| 8,407,027 B2 * | 3/2013 | Myougan | F03G 7/04 60/641.2 |
| 2010/0095742 A1 * | 4/2010 | Symington | E21B 41/0064 73/23.35 |
| 2011/0125451 A1 * | 5/2011 | Cheifetz | F24J 3/08 702/130 |

* cited by examiner

*Primary Examiner* — Mohamed Charioui
*Assistant Examiner* — Jeremy Delozier
(74) *Attorney, Agent, or Firm* — Norton Rose Fulbright Canada LLP

(57) ABSTRACT

A system and method for performing at least one thermal response test for a medium. At least one request signal indicative of at least one request to perform the thermal response test is received. On the basis of the at least one request, at least one control signal is generated for causing at least one parameter of a fluid circulating through the medium to be acquired. The at least one measurement is indicative of a thermal property of the medium. The at least one control signal is then output to a hydraulic system.

20 Claims, 20 Drawing Sheets

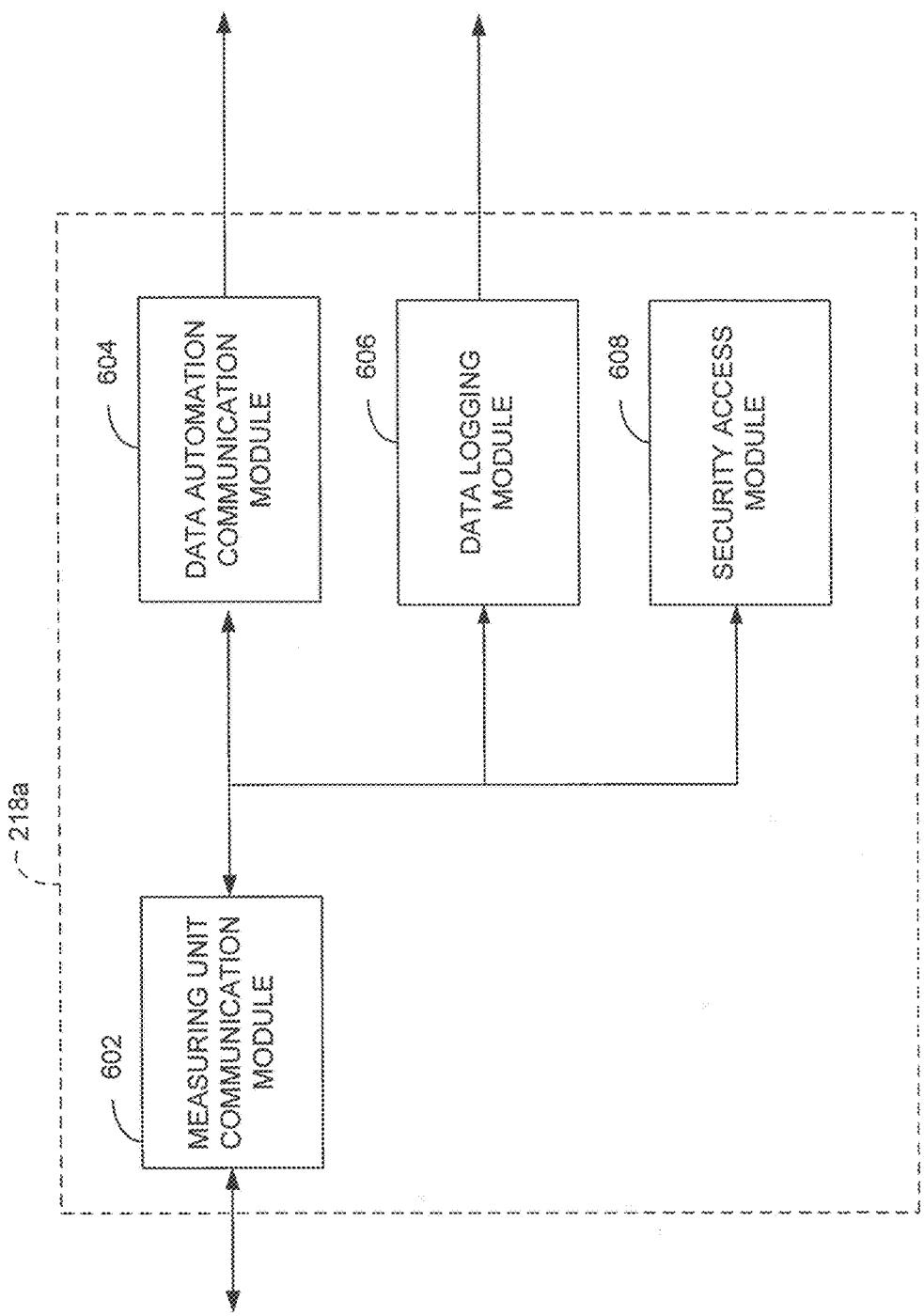

SYSTEM AND METHOD FOR THERMAL RESPONSE TESTING

CROSS-REFERENCE TO RELATED APPLICATIONS

This patent application claims priority of U.S. provisional Application Ser. No. 61/805,354, filed on Mar. 26, 2013, the contents of which are hereby incorporated by reference.

TECHNICAL FIELD

The present invention relates to the field of thermal response testing.

BACKGROUND OF THE ART

Thermal response tests, such as thermal conductivity tests, are performed to assist in the design and installation of sustainable ground source heating or cooling solutions. For this purpose, a fluid is passed through a test borehole loop and testing instrumentation is used to record data throughout the duration of the test. However, such instrumentation is typically bulky, thereby causing delays due to mobilizing and demobilizing thereof. In addition, the instrumentation can present an unsafe solution due to exposed cables or pipes. Moreover, on-site operators are typically required to operate the tests, proving inefficient in some cases.

There is therefore a need for an improved system and method for thermal response testing.

SUMMARY

In accordance with a first broad aspect, there is provided a system for performing a thermal response test for a medium, the system comprising a first processing unit; at least one second processing unit remotely connected to the first processing unit; and a control unit connected to the at least one second processing unit and to a hydraulic system configured to circulate a fluid through the medium, the first processing unit configured to receive a request signal comprising control data indicative of a request for the thermal response test to be performed and transmit the control data to the at least one second processing unit, the at least one second processing unit configured to receive the control data from the first processing unit and transmit the received control data to the control unit, and the control unit configured to receive the control data from the at least one second processing unit, generate on the basis of the control data a control signal comprising instructions for causing at least one parameter of the fluid circulating through the medium to be acquired, the at least one parameter indicative of a thermal property of the medium, and output the control signal to the hydraulic system.

In accordance with a second broad aspect, there is provided a computer-implemented method for performing a thermal response test for a medium, the method comprising at a first processing unit, receiving a request signal comprising control data indicative of a request for the thermal response test to be performed and transmitting the control data to at least one second processing unit remotely connected to the first processing unit; at the at least one second processing unit, receiving the control data from the first processing unit and transmitting the received control data to control unit connected to the at least one second processing unit and to a hydraulic system configured to circulate a fluid through the medium; and at the control unit, receiving the control data from the at least one second processing unit, generating on the basis of the control data a control signal comprising instructions for causing at least one parameter of the fluid circulating through the medium to be acquired, the at least one parameter indicative of a thermal property of the medium, and outputting the control signal to the hydraulic system.

In accordance with a third broad aspect, there is provided a computer readable medium having stored thereon program code executable by a processor for performing a thermal response test for a medium, the program code executable for at a first processing unit, receiving a request signal comprising control data indicative of a request for the thermal response test to be performed and transmitting the control data to at least one second processing unit remotely connected to the first processing unit; at the at least one second processing unit, receiving the control data from the first processing unit and transmitting the received control data to control unit connected to the at least one second processing unit and to a hydraulic system configured to circulate a fluid through the medium; and at the control unit, receiving the control data from the at least one second processing unit, generating on the basis of the control data a control signal comprising instructions for causing at least one parameter of the fluid circulating through the medium to be acquired, the at least one parameter indicative of a thermal property of the medium, and outputting the control signal to the hydraulic system.

BRIEF DESCRIPTION OF THE DRAWINGS

Further features and advantages of the present invention will become apparent from the following detailed description, taken in combination with the appended drawings, in which:

FIG. 4c is a schematic diagram of an application running on the processor of the thermal response test computer of FIG. 2;

FIG. 5b is a detailed schematic diagram of a user device of FIG. 5a accessing a selected one of the data collection systems of FIG. 5a;

It will be noted that throughout the appended drawings, like features are identified by like reference numerals.

DETAILED DESCRIPTION

Figure 1:
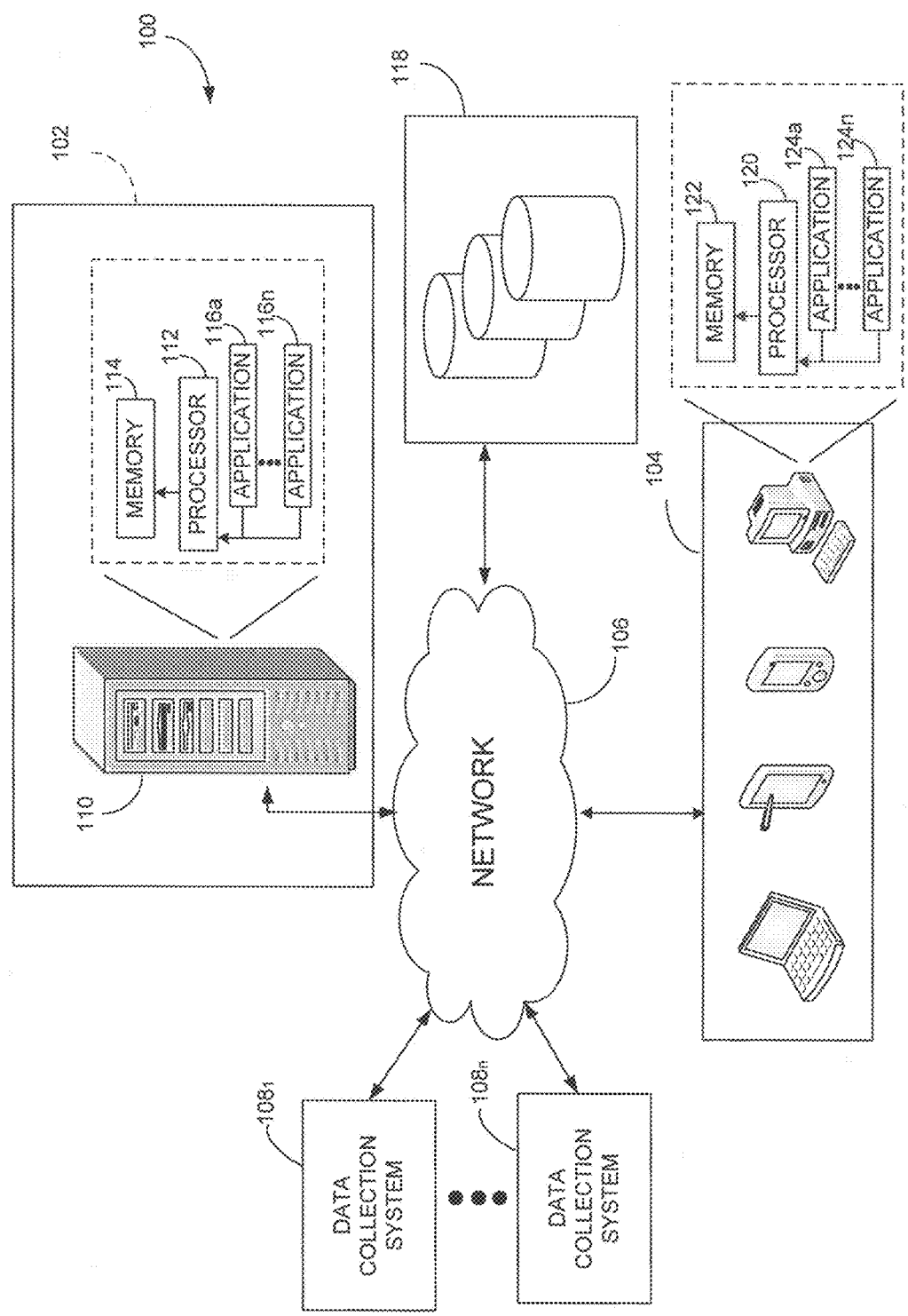
FIG. 1 is a schematic diagram of a system for performing a thermal response test in accordance with an illustrative embodiment of the present invention.

Referring now to FIG. 1, a system 100 for performing a thermal response test will now be described. The system 100 comprises a testing system 102, which may communicate with a plurality of devices 104 via a network 106, such as the Internet, a cellular network, or others known to those skilled in the art. The devices 104 may further enable users, such as technicians and operators, to access the testing system 102 and may comprise any device, such as a computer, e.g. a laptop or a desktop computer, a personal digital assistant (PDA), a smartphone, or the like, adapted to communicate over the network 106. Each device 104 may access the testing system 102 over the network 106 through routers (not shown) or other suitable devices. The testing system 102 may also be in communication with one or more data collection systems $108_1, \ldots, 108_n$ over the network 106 in order to operate the desired thermal response tests, e.g. thermal conductivity tests, as will be discussed further below. In one embodiment, the system 102 may only allow a single user to operate a given test conducted at a single data collection system as in $108_1$ using his/her device 104. Still, several users may operate different tests conducted at different data collection systems $108_1, \ldots, 108_n$ simultaneously by accessing the system 102 with their respective devices 104. Also, a single user may operate different tests conducted at several data collection systems $108_1, \ldots, 108_n$ using the system 102. Moreover, several users may be allowed to simultaneously access testing data for visualizing the latter.

It should be understood that, although thermal conductivity tests are described herein, thermal response tests for determining other thermal properties of a medium, such as thermal diffusivity, formation heat capacity, and borehole resistance, may apply. Also, the system 100 may be used to measure electrical thermal response. It should also be understood that users of the devices 104 may either be on-site at the data collection system(s) $108_1, \ldots, 108_n$ or in a location remote from the data collection system(s) $108_1, \ldots, 108_n$ (as illustrated in FIG. 1). In one embodiment, it may be desirable for users of the devices 104 to be remote from the data collection system(s) $108_1, \ldots, 108_n$ in order to ensure the safety of the users. Also, although illustrated as separate and remote from the devices 104, it should be understood that the testing system 102 may be integrated with the devices 104, either as a downloaded software application, a firmware application, or a combination thereof.

The testing system 102 may comprise one or more server(s) 110. For example, a series of servers corresponding to a web server, an application server, and a database server may be used. These servers are all represented by server 110 in FIG. 1. The server 110 may comprise, amongst other things, a processor 112 coupled to a memory 114 and having a plurality of applications $116a, \ldots, 116n$ running thereon. The processor 112 may access the memory 114 to retrieve data. The processor 112 may be any device that can perform operations on data. Examples are a central processing unit (CPU), a microprocessor, and a front-end processor. The applications $116a, \ldots, 116n$ are coupled to the processor 112 and configured to perform various tasks as explained below in more detail. An output may be transmitted to the devices 104 and/or the data collection systems $108_1, \ldots 108_n$. It should be understood that while the applications $116a, \ldots, 116n$ presented herein are illustrated and described as separate entities, they may be combined or separated in a variety of ways.

The memory 114 accessible by the processor 112 may receive and store data. The memory 114 may be a main memory, such as a high speed Random Access Memory (RAM), or an auxiliary storage unit, such as a hard disk or flash memory. The memory 114 may be any other type of memory, such as a Read-Only Memory (ROM), Erasable Programmable Read-Only Memory (EPROM), or optical storage media such as a videodisc and a compact disc.

One or more databases 118 may be integrated directly into the memory 114 or may be provided separately therefrom and remotely from the server 110 (as illustrated). In the case of a remote access to the databases 118, access may occur via any type of network 106, as indicated above. The databases 118 described herein may be provided as collections of data or information organized for rapid search and retrieval by a computer. The databases 118 may be structured to facilitate storage, retrieval, modification, and deletion of data in conjunction with various data-processing operations. The databases 118 may consist of a file or sets of files that can be broken down into records, each of which consists of one or more fields. Database information may be retrieved through queries using keywords and sorting commands, in order to rapidly search, rearrange, group, and select the field. The databases 118 may be any organization of data on a data storage medium, such as one or more servers.

In one embodiment, the databases 118 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

Still referring to FIG. 1, each device as in 104 may comprise, amongst other things, a processor 120 coupled to a memory 122 (e.g. a main memory, such as a high speed Random Access Memory (RAM), an auxiliary storage unit, such as a hard disk or flash memory, or other type of memory, such as a Read-Only Memory (ROM), Erasable Programmable Read-Only Memory (EPROM), or optical storage media such as a videodisc and a compact disc) and having a plurality of applications 124a, . . . , 124n running thereon. The processor 120 may access the memory 122 to retrieve data. The processor 120 may be any device that can perform operations on data. Examples are a central processing unit (CPU), a microprocessor, and a front-end processor. The applications 124a, . . . , 124n are coupled to the processor 120 and configured to perform various tasks as explained below in more detail. It should be understood that while the applications 124a, . . . , 124n presented herein are illustrated and described as separate entities, they may be combined or separated in a variety of ways.

Figure 2:
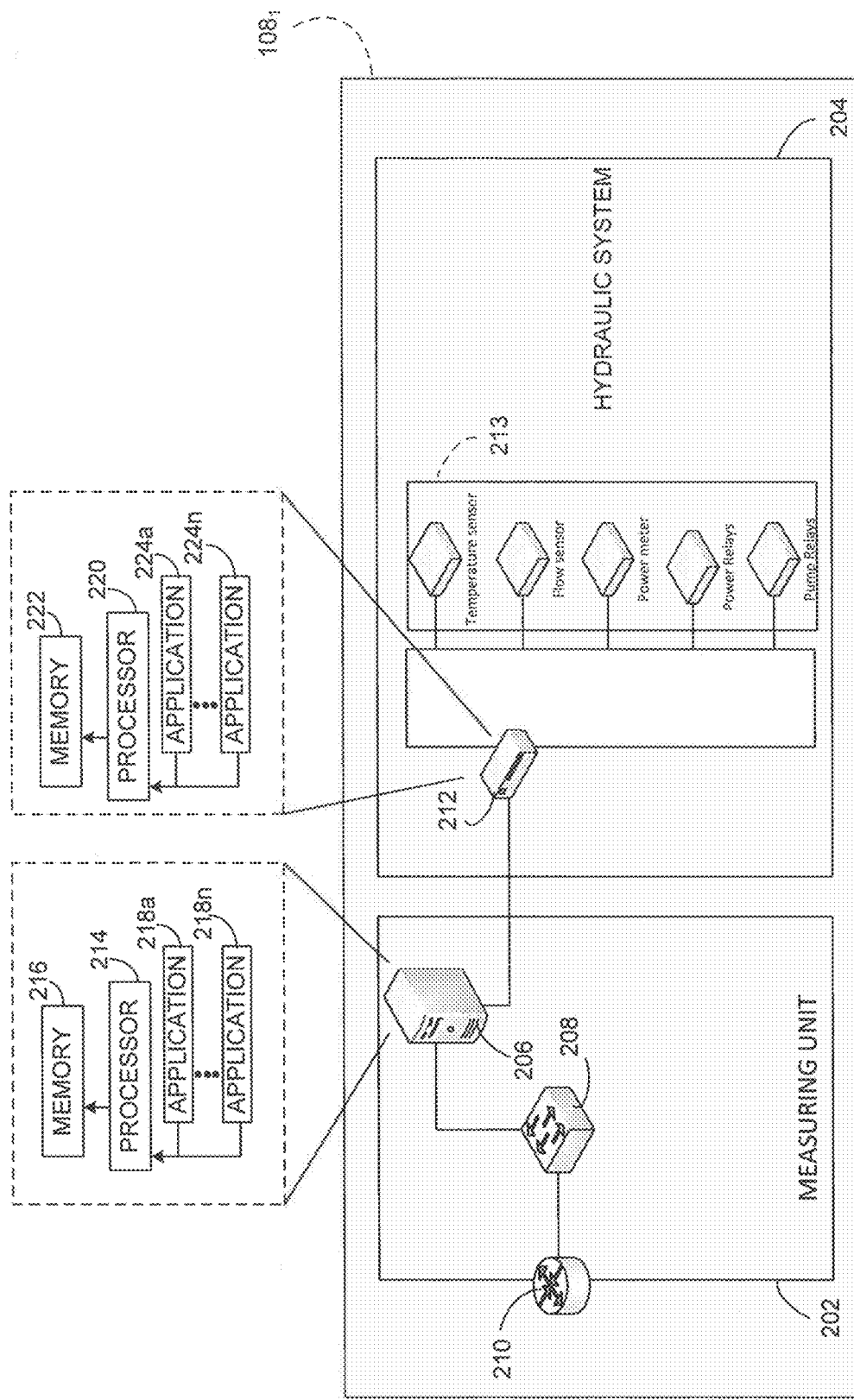
FIG. 2 is a schematic diagram of a data collection system of FIG. 1.

Referring now to FIG. 2, each data collection system as in $108_1$ illustratively comprises a measuring unit 202, which may be connected (e.g. electrically) to a hydraulic system 204 for acquiring measurements of one or more parameters of components the hydraulic system 204 during the thermal conductivity tests. In particular, the measuring unit as in 202 may comprise a local (or on-site) thermal response testing (TRT) computer 206, e.g. a laptop computer, desktop computer, or any other suitable device. In one embodiment, the testing system 102 may be integrated (at least in part) with the computer 206, e.g. as a downloaded software application, to enable the computer 206 to access the testing system 102 and receive therefrom commands for controlling the operation of the hydraulic system 204 and acquiring testing data therefrom. The commands may comprise commands to conduct a thermal conductivity test or obtain test results upon completion of the test. The commands may be received from one or more of the devices (reference 104 in FIG. 1). Upon receiving the commands, the computer 206 illustratively outputs one or more control signals to the hydraulic system 204 to control the operation thereof in accordance with the received commands. The computer 206 may further receive from the hydraulic system 204 data, e.g. test results, in response to the control signals. The computer 206 may then transmit the received data to the testing system 102 for transmission to the one or more of the devices 104, e.g. to the device having requested conduction of the test.

For this purpose, the computer 206 illustratively communicates with the network (reference 106 in FIG. 1) via a network switch 208 to which the computer 206 is connected either wirelessly or through a wired connection. In one embodiment, the switch 208 is a TCP/IP switch. It should be understood that other suitable devices may apply. The switch 208 may in turn be connected to a router 210, e.g. a Global System for Mobile Communications (GSM), Asymmetric Digital Subscriber Line (ADSL), WiFi™, or other suitable router, for allowing communication with the network 106. The computer 206 may further communicate with the hydraulic system 204 via a control unit or device, such as a Programmable Logic Controller (PLC) 212, connected to the computer 206 through a serial port or the like. The control unit 212 may further be connected to one or more sensors as in 213, e.g. a temperature sensor, a flow sensor, a power meter, power relays, and pump relays, which may be provided at the hydraulic system 204 to acquire desired measurements. As will be discussed further below, the control unit 212 may be used to control execution of the commands received from the devices 104.

As can be seen in FIG. 2, the computer 206 may comprise, amongst other things, a processor 214 coupled to a memory 216 and having a plurality of applications 218a, . . . , 218n running thereon. Similarly, the control unit 212 may comprise, amongst other things, a processor 220 coupled to a memory 222 and having a plurality of applications 224a, . . . , 224n running thereon. The memories 216 and 222 may each comprise a main memory, such as a high speed Random Access Memory (RAM), an auxiliary storage unit, such as a hard disk or flash memory, or other type of memory, such as a Read-Only Memory (ROM), Erasable Programmable Read-Only Memory (EPROM), or optical storage media such as a videodisc and a compact disc. The processors 214 and 220 may respectively access the memories 216 and 222 to retrieve data. The processors 214 and 220 may be any device that can perform operations on data. Examples are a central processing unit (CPU), a microprocessor, and a front-end processor. The applications 218a, . . . , 218n and 224a, . . . , 224n are respectively coupled to the processors 214 and 220 and configured to perform various tasks as explained below in more detail. It should be understood that while the applications 218a, . . . , 218n and 224a, . . . , 224n presented herein are illustrated and described as separate entities, they may be combined or separated in a variety of ways.

In one embodiment, the modules found in the applications 116a, . . . , 116n, 124a, . . . , 124n, and 218a, . . . , 218n may exchange data in real-time using the Object Linking and Embedding (OLE) for Process Control or Open Platform Communications (OPC) communication standard. It should be understood that any other suitable standard may also apply.

In order to communicate the received commands to the hydraulic system 204, the computer 206 sends one or more control signals indicative of the commands to the control unit 212. The control unit 212 in turn routes the signal(s) to components of the hydraulic system 204, as will be discussed further below. Upon receiving the signal(s), the components of the hydraulic system 204 proceeds accordingly. In one embodiment, subsequent to execution of the received commands, pertinent testing data is collected by one or more of the sensors 213. The testing data is then transmitted from the sensors 213 to the control unit 212, which then routes the data to the computer 206 of the measuring unit 202. If it is desired to further communicate the testing data to the system 102 and eventually to the devices 104, the switch 208 may connect the computer 206 to the network (reference 106 in FIG. 1) via the router 210. The router 210 may in turn enable the computer 206 to communicate with the testing system 102 over the network 106 using virtual private network (VPN) access or the like. The testing system 102 may then make the received testing data available to the devices 104.

Figure 3:
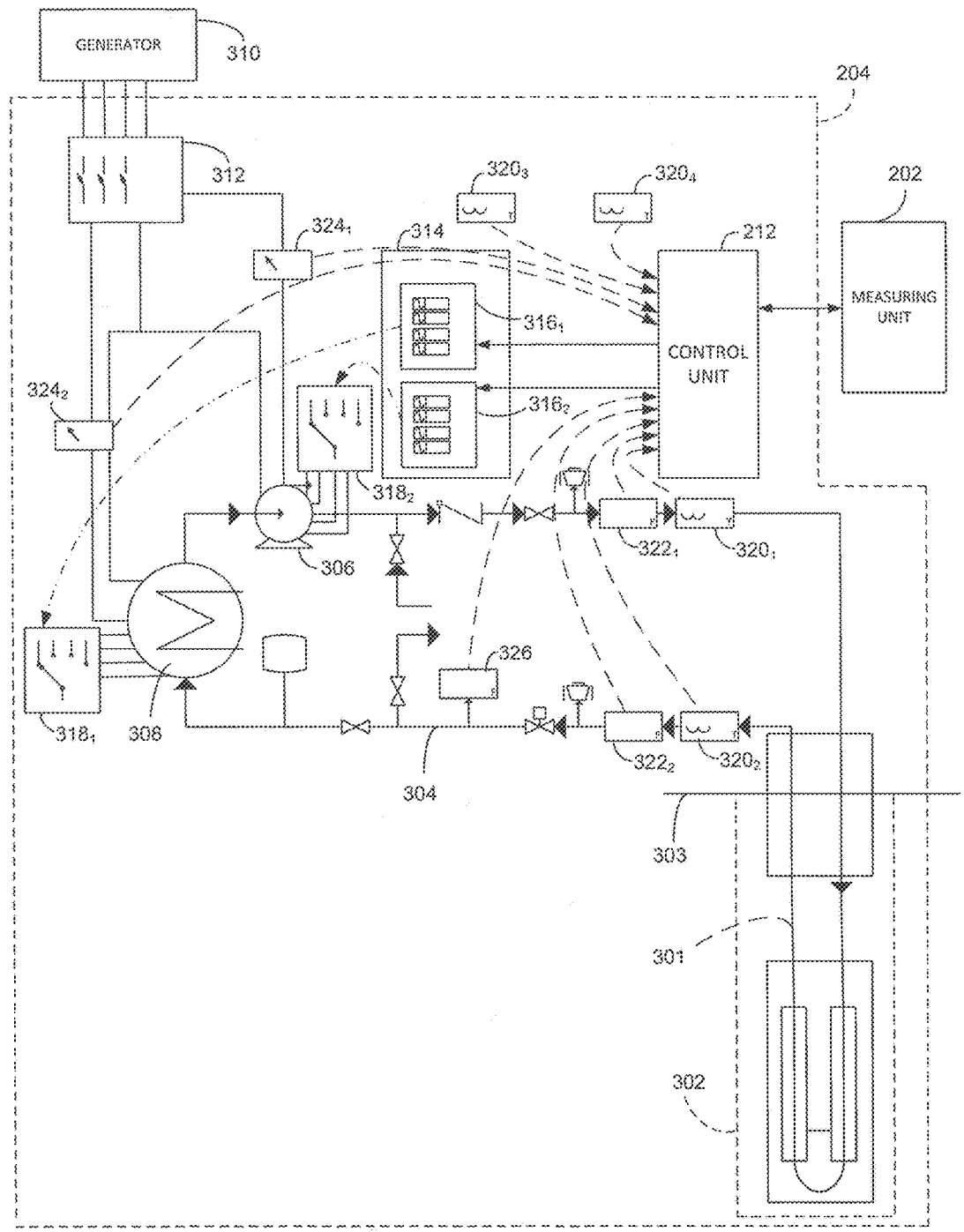
FIG. 3 is a schematic diagram of the hydraulic system of FIG. 2.

Referring now to FIG. 3, there is illustrated a first embodiment of the hydraulic system 204. The hydraulic system 204 illustratively comprises drill pipes 301 used in a geothermal drilling process. Although a pair of drill pipes as in 301 have been shown for illustrative purposes, it should be understood that more than two (2) such pipes as in 301 may be used. The hydraulic system 204 illustratively further comprises a plurality of components enclosed in a housing (not shown). In particular, the hydraulic system 204 may comprise a geothermal heat exchanger 302 having connected thereto a hydraulic circuit 304 comprising suitable piping (not shown). The heat exchanger 302 may be buried beneath the surface (e.g. the ground surface 303) a medium (not shown), such as a portion of the earth, having thermal properties. The heat exchanger 302 can be installed either vertically (as illustrated) or horizontally in a borehole, e.g. a narrow shaft bored in the ground during the geothermal drilling process.

A fluid (not shown), such as air, a liquid (e.g. water or a glycol solution), or a mixture of both, flows through the circuit 304 and heat exchanger 302 and is propelled by a circular pump 306. In this manner, the heat exchanger 302 can transfer heat between the fluid and the earth surrounding the circuit 304 and may use the earth as a heat source or a heat sink. A plurality of valves (not shown) further control the flow of the fluid through the circuit 304. The fluid is illustratively at a lower temperature than the surrounding ground and is warmed as it progresses through the circuit 304. For this purpose, the temperature of the fluid is controlled using an electrical boiler 308, which is connected to the circuit 304 and the pump 306. Power is supplied to the pump 306 and the boiler 308 by a generator 310, which may be a 10 kV two or three-phase generator (or other suitable generator). As such, the hydraulic system 204 is self-sufficient. The amount of energy supplied by the generator 310 to the hydraulic system 204 is controlled by a general power switch 312 connecting the pump 306 and the boiler 308 to the generator 310.

As discussed above, operation of the hydraulic system 204, and more particularly operation of the pump 306 and of the boiler 308, may be controlled through the measuring unit 202 and the control unit 212 in accordance with commands received from a user. For this purpose, a relay system 314 is provided, which comprises boiler relays $316_1$ and pump relays $316_2$. The boiler relays $316_1$ control, e.g. increase or decrease, the level of temperature of the fluid exiting the boiler 308 while the pump relays $316_2$ control, e.g. increase or decrease, the speed of the fluid propelled by the pump 306. The relays $316_1$ and $316_2$ may also be used to activate or deactivate the pump 306 and boiler 308. It should be understood that the relays $316_1$ and $316_2$ may be used to control other operating parameters of the pump 306 and boiler 308 if needed. In one embodiment, the relays $316_1$ and $316_2$ are respectively connected to and activate switches $318_1$ and $318_2$ respectively connected to the boiler 308 and the pump 306 for controlling operation thereof. Although a relay system 314 comprising relays as in $316_1$, $316_2$ is described for illustrative purposes, it should be understood that a power controller (not shown) may also be used to control the pump 306 and boiler 308.

Each one of the relays $316_1$, $316_2$ illustratively comprises a low power electrical circuit (not shown) adapted to respond to numerical commands from the control unit 212. In one embodiment, the IP protocol enables the control unit 212 and components of the hydraulic system 204 to exchange information. It should be understood that any other suitable communication protocol may apply, as discussed above. The commands are typically received in a binary format. In one embodiment, it may be desired for the device being controlled, e.g. the boiler 308 or the pump 306, to operate at two (2) different levels. In this case, a single one of the relays $316_1$ or $316_2$ (e.g. a single one of the relays $316_2$ if the pump 306 is to be controlled) may be used to control the device. A command received at the relay may indeed comprise a single binary digit, i.e. '0' or '1'. The command '1' may be associated with closing a contact (not shown) of the relay, thereby triggering the device, whereas the command '0' may be associated with opening the contact, thereby stopping the device. In other embodiments where it is desired for the device being controlled, e.g. the boiler 308 or the pump 306, to operate at three (3) different levels, e.g. speeds, two (2) of the relays $316_1$ or $316_2$ (e.g. two (2) of the relays $316_2$ if the pump 306 is to be controlled) may be used. In this case, each command received at the relays $316_2$ may then comprise two (2) binary digits. For instance, the command '00' may be associated with an instruction to stop the pump 306, the command '01' may be associated with an instruction to operate the pump 306 at the first speed, the command '10' may be associated with an instruction to operate the pump 306 at the second speed, and the command '11' may be associated with an instruction to operate the pump 306 at the third speed.

In yet another embodiment, if it is desired for the device being controlled, e.g. the boiler 308 or the pump 306, to operate at seven (7) different power levels, three (3) of the relays $316_1$ or $316_2$ (e.g. three (3) of the relays $316_1$ if the boiler 308 is to be controlled) may be used. Each command received at the relays $316_1$ may then comprise three (3) binary digits. For instance, the command '000' may be associated with an instruction to stop the boiler 308. The command '001' may be associated with an instruction to operate the boiler 308 at the first power level. The command '010' may be associated with an instruction to operate the boiler 308 at the second power level. The command '011' may be associated with an instruction to operate the boiler 308 at the third power level. The command '100' may be associated with an instruction to operate the boiler 308 at the fourth power level. The command '101' may be associated with an instruction to operate the boiler 308 at the fifth power level. The command '110' may be associated with an instruction to operate the boiler 308 at the sixth power level. Finally, the command '111' may be associated with an instruction to operate the boiler 308 at the seventh power level. It should be understood that, by adjusting the number of relays $316_1$, $316_2$ being used, each device, e.g. pump 306 or boiler 308, may be controlled so as to operate according to a variety of desired levels.

Further to outputting commands, e.g. to the relays $316_1$, $316_2$, the control unit 212 provided at the hydraulic system 204 is further adapted to receive data, e.g. measurements, from a variety of devices and components provided at the hydraulic system 204. The control unit 212 may receive the data from the devices wirelessly (as illustrated by the dashed arrows in FIG. 3) or through wired connections (not shown). Temperature sensors as in $320_1$ and $320_2$ respectively positioned at the outlet and the inlet of the circuit 304 illustratively measure the temperature of the fluid flowing through the circuit 304. The temperature measurements are then periodically sent to the control unit 212. The control unit 212 further receives data from temperature sensor $320_3$, which measures the ambient temperature surrounding the hydraulic system 204, and temperature sensor $320_4$, which measures the temperature within the housing (not shown) of the hydraulic system 204. Data may also be received at the control unit 212 from pressure sensors $322_1$ and $322_2$ respectively positioned at the outlet and the inlet of the circuit 304. A first energy meter $324_1$ and a second energy meter $324_2$ respectively measuring the energy consumed by the pump 306 and the boiler 308 further output data to the control unit 212. Readings from a flow meter 326 may also be received at the control unit 212 and are indicative of the rate of flow of the fluid circulating through the circuit 304. The collected data may then be obtained in real-time by the measuring unit 202 communicating with the control unit 212 using any suitable protocol, such as TCP/IP. As discussed above, the measuring unit 202 may in turn communicate the collected data to the testing system (reference 102 in FIG. 1) and the testing data is ultimately rendered on the devices (reference 104 in FIG. 1). In this manner, the thermal properties of the ground conditions at the location of boreholes can be determined from the collected data.

In one embodiment, the hydraulic system (reference 204 in FIG. 1) (i.e. the components thereof provided within the housing mentioned above) is mobile and has a compact size with a reduced weight and can therefore be portable. Illustratively, the hydraulic system 204 has a height of seventy (70) centimeters, a length of sixty (60) centimeters, a width of thirty (30) centimeters, and a weight of up to thirty-six (36) kilograms. Other dimensions may apply. The compactness of the hydraulic system 204 can be achieved using flexible piping (not shown) that ensures ninety (90) degrees bends are not formed in the hydraulic circuit 304. The choice of the type of pump 306 may also affect the size of the hydraulic system 204. In addition, proper calibration of the sensors present in the hydraulic system 204 may further allow to compensate for any error margins resulting from bends in the piping. The hydraulic system 204 may also use flow sensors, such as the flow meter 326, chosen to have a size and/or shape so as not to obstruct or otherwise reduce the diameter of the piping. The temperature and pressure sensors as in $320_1$, $320_2$ and $322_1$, $322_2$ may also be connected to the hydraulic circuit 304 so as not to cause forces, which are opposite to fluid flow. A flow regulator (not shown) may also be used to ensure that the flow of the fluid through the hydraulic circuit 304 is substantially constant. It may further be desirable to observe an indicated minimum length of piping before and after the flow meter 326 in order to prevent distortions in the flow rate measurement.

Figure 4A:
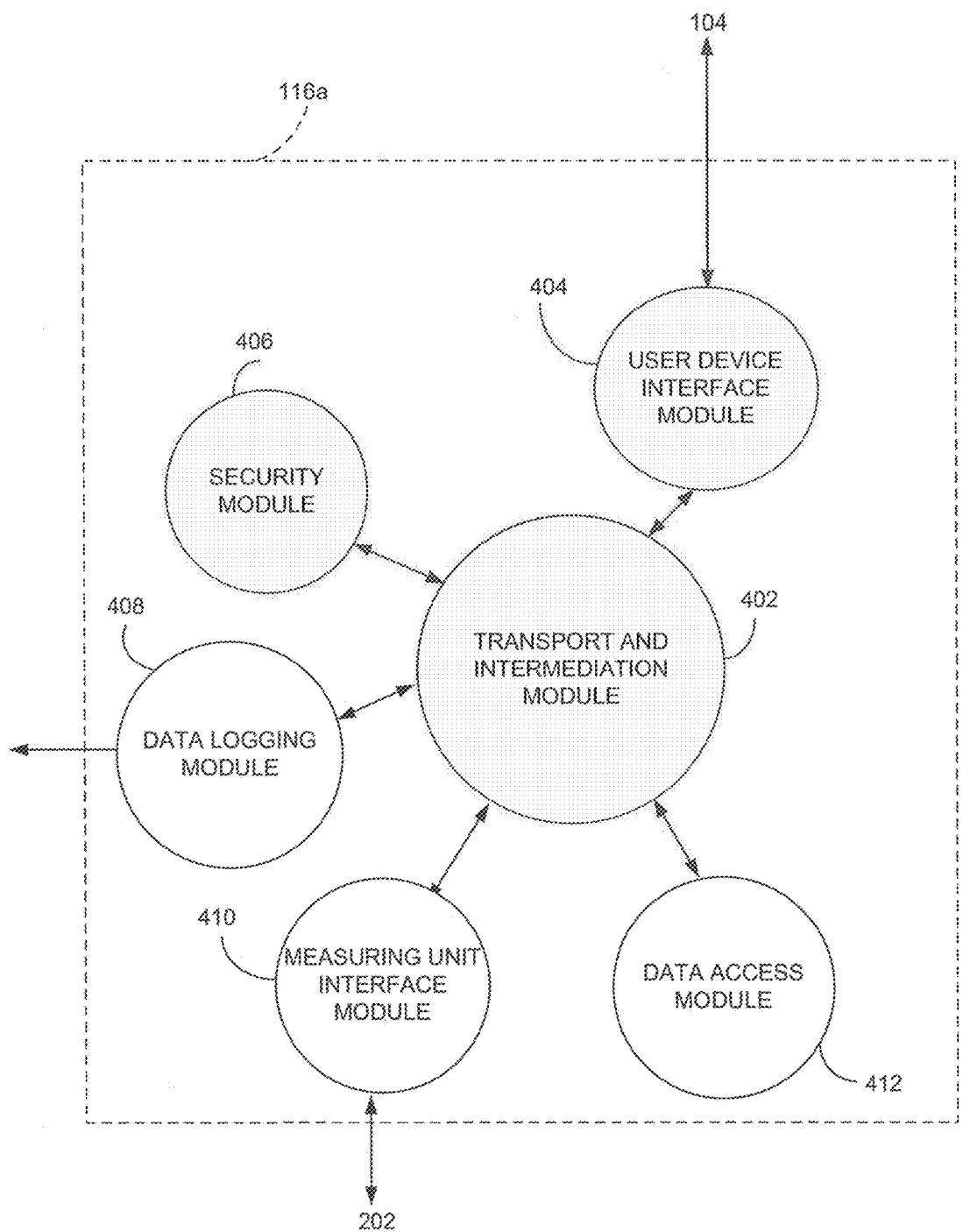
FIG. 4a is a schematic diagram of an application running on the processor of the testing system's server of FIG. 1.

FIG. 4a is an exemplary embodiment of an application 116a running on the processor 112 of FIG. 1. The application 116a illustratively comprises a transport and intermediation module 402, a user device interface module 404, a security module 406, a data logging module 408, a measuring unit interface module 410, and a data access module 412. In one embodiment, the transport and intermediation module 402 enables the exchange of information, e.g. messages and testing data, between the devices 104 and the measuring unit as in 202 of each one of the data collection systems (reference $108_1$, . . . , $108_n$ of FIG. 1). For this purpose, the transport and intermediation module 402 may be used to link each one of the modules 404, 406, 408, 410, 412 to remaining ones of the modules 404, 406, 408, 410, 412. In one embodiment, any module 404, 406, 408, 410, 412 may periodically ping the transport and intermediation module 402 to determine whether messages intended for the module in question are to be retrieved from the transport and intermediation module 402. Alternatively, the transport and intermediation module 402 may inform any given module 404, 406, 408, 410, 412 as soon as the module in question has been identified as the recipient of a message received at the transport and intermediation module 402.

In this manner, the modules 404, 406, 408, 410, 412 can exchange data with one another in an asynchronous manner. As all communications illustratively pass through the transport and intermediation module 402, the modules 404, 406, 408, 410, 412 remain completely autonomous and can therefore operate (i.e. perform their tasks) independently from one another. The modules 404, 406, 408, 410, 412 may then have, or make use of, little or no knowledge of each other's characteristics or definitions, thereby increasing the stability of the system (reference 100 in FIG. 1). For instance, any problem, such as a power failure or communication problem, that may occur in the system 100 and tamper with communication between a device 104 and the testing system (reference 102 in FIG. 1) may not affect completion of a task (e.g. automated data collection) having been commanded to the measuring unit as in 202 and being carried out thereat.

Still referring to FIG. 4a, the user device interface module 404 and the measuring unit interface module 410 respectively provide the user devices 104 and measuring units as in 202 access to the system 102. In particular, the user device interface module 404 and the measuring unit interface module 410 respectively enable the devices 104 and the measuring units 202 to communicate with the system 102 using any suitable communication protocol as mentioned above. For this purpose, the user device interface module 404 and the measuring unit interface module 410 are respectively adapted to process at once numerous requests from the devices 104 and measuring units as in 202.

Figure 4B:
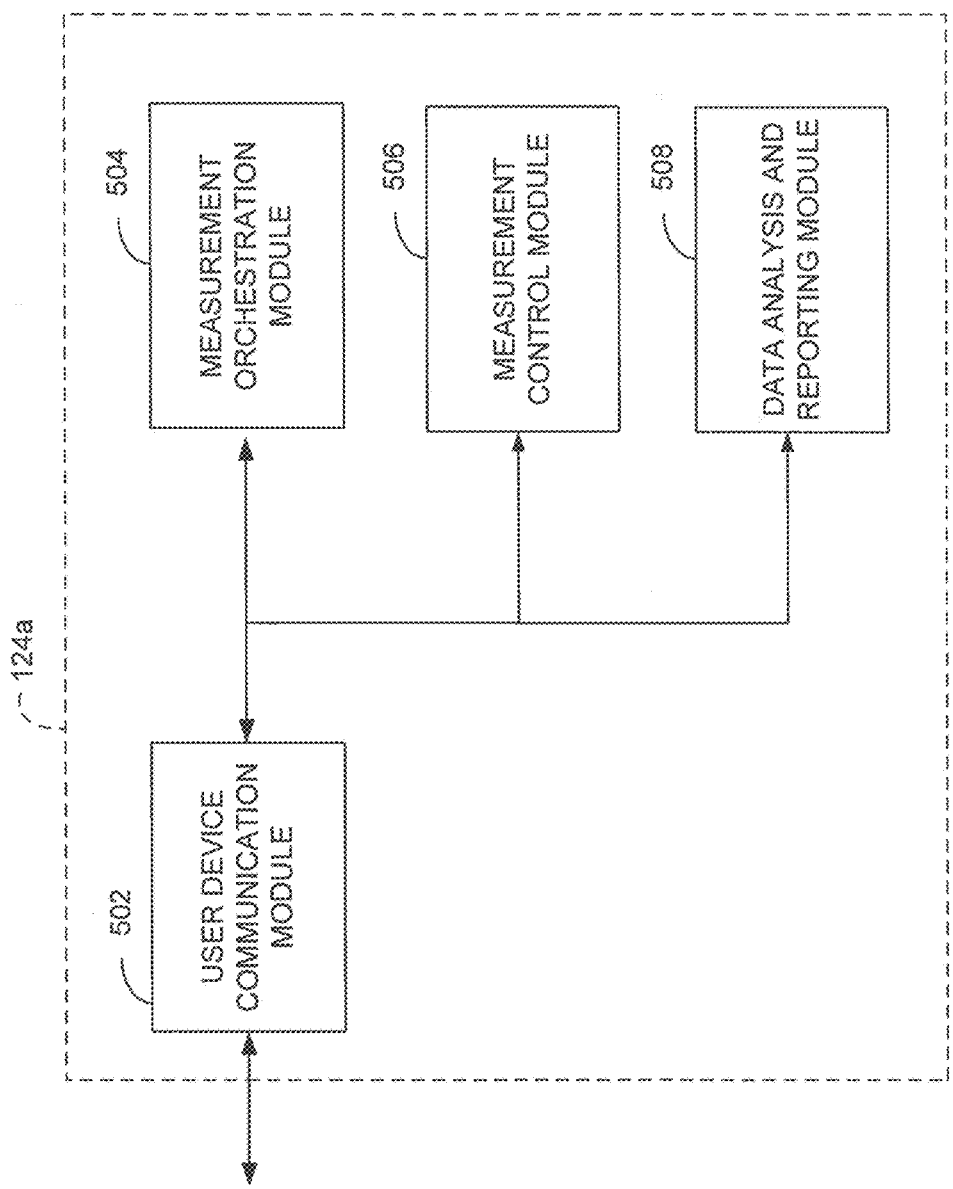
FIG. 4b is a schematic diagram of an application running on the processor of a user device of FIG. 1.
Figure 4D:
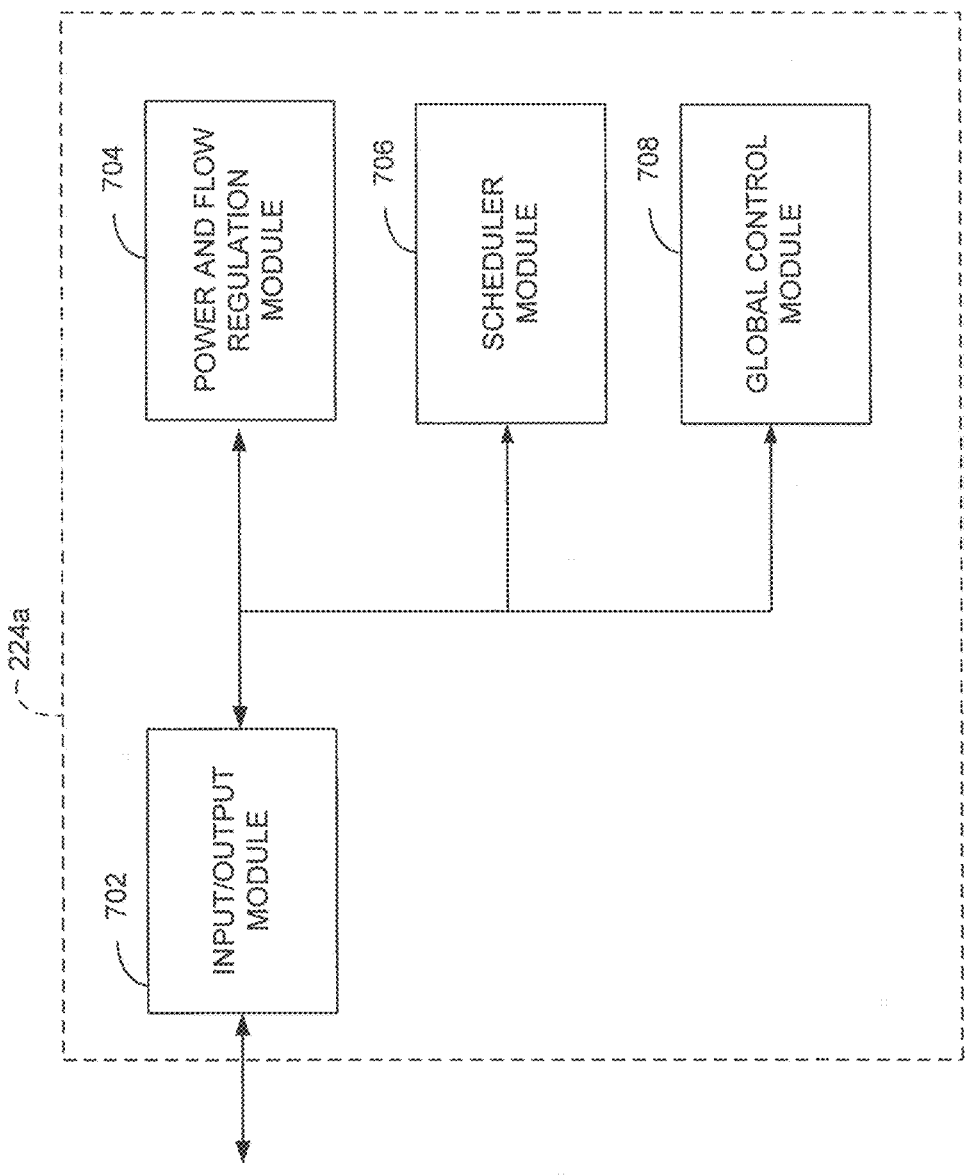
FIG. 4d is a schematic diagram of an application running on the processor of the control device of FIG. 1.

FIG. 4b is an exemplary embodiment of an application 124a running on the processor 120 of FIG. 1. The application 124a illustratively comprises a user device communication module 502, a measurement orchestration module 504, a measurement control module 506, and a data analysis and reporting module 508. As shown in FIG. 4c, the application 218a running on the processor 214 of FIG. 2 illustratively comprises a measuring unit communication module 602, a data automation communication module 604, a data logging module 606, and a security access module 608. As shown in FIG. 4d, the application 224a running on the processor 220 of FIG. 2 illustratively comprises an input/output module 702, a power and flow regulation module 704, a scheduler module 706, and a global control module 708.

Figure 5A:
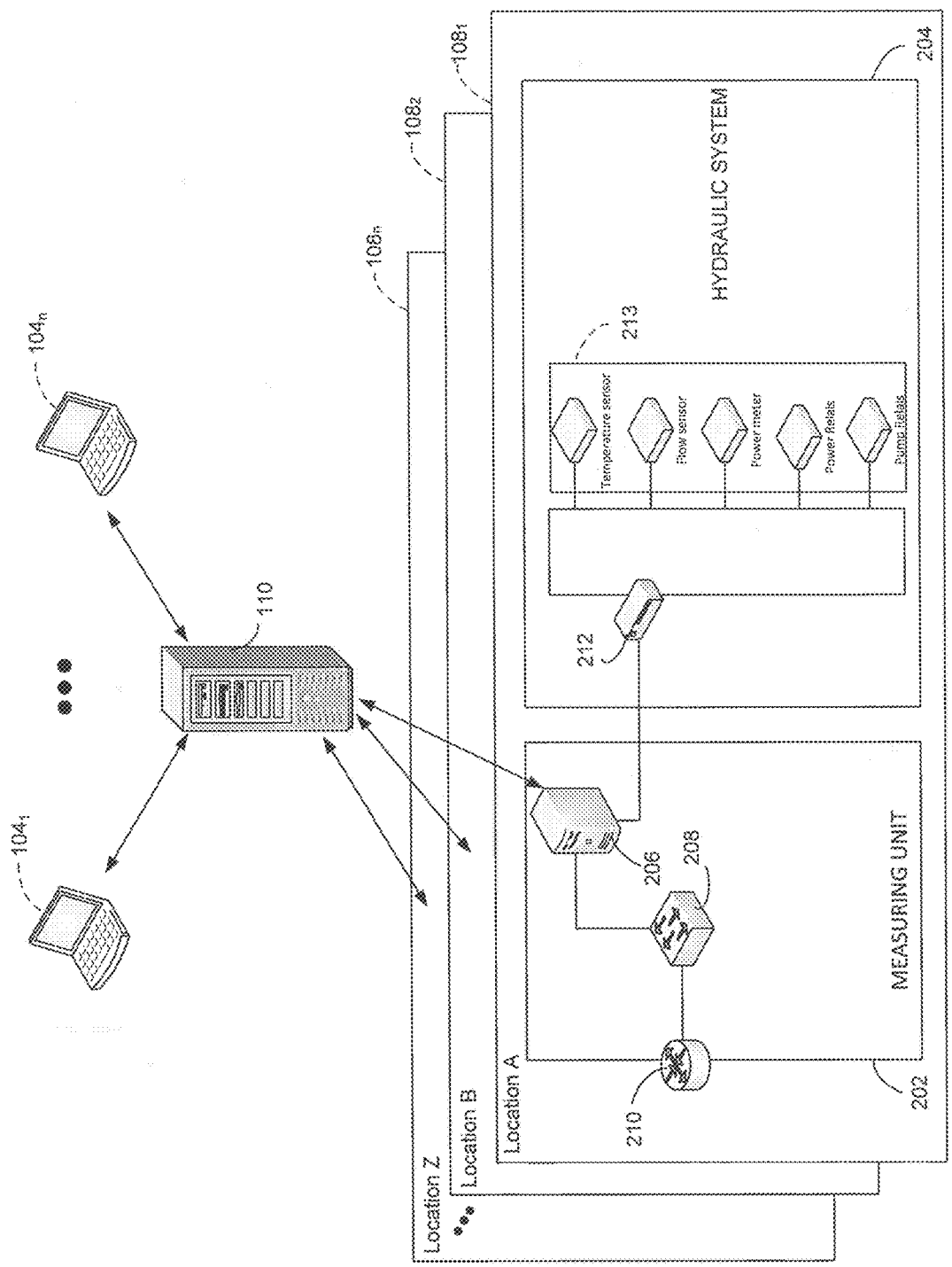
FIG. 5a is a schematic diagram of several user devices accessing several data collection systems, in accordance with an illustrative embodiment of the present invention.

Referring to FIG. 5a, in one embodiment, a single user device as in $104_1$ may connect to a given data collection system $108_1$ with data exchanges occurring asynchronously therebetween via the server 110. In another embodiment, several user devices as in $104_1$, . . . , $104_n$ may access the system 102 to simultaneously communicate with several data collection systems as in $108_1$, . . . , $108_n$ using the server 110 as a central point for data exchanges. In particular, several users may connect to the system 102 at once and select a measuring unit as in 202 for performing a thermal response test. The system 102, upon authenticating the user, may then authorize the latter to have access to data (e.g. to given areas of memories having the data stored therein) for the selected measuring unit 202. In particular, the system 102 may provide the user access to a copy or duplicate of the data (e.g. measurement data) currently stored in the memory of the measuring unit 202, as will be discussed further below. The user may then freely view and make any desired changes to the duplicate data. The server 110 may then update the memory of the measuring unit 202 accordingly to ensure that the changes made by the user are reflected in the original data. In particular, if several users access and manipulate data for a same measuring unit 202, the latter receives the data serially without any conflict. In this manner, it becomes possible to prevent several users from directly accessing and simultaneously changing the data stored in the memory of the TRT computer 206 provided at the measuring unit 202. As a result, disturbances in the TRT computer's operating logic can be avoided.

Moreover, use of the system 102 allows a testing sequence to be performed from beginning to start and thus avoids undesirable interruptions in an undergoing testing sequence. Such interruptions may indeed lead to wrong results and measurements and therefore require the testing to be stopped and restarted at a later time (e.g. days or weeks), which is necessary to allow the borehole to return to its initial thermal state). In addition, using the system 102, it becomes possible to reduce the load on the TRT computer 206 as the load on the processor (reference 214 in FIG. 2) is illustratively independent on the number of user devices as in 104$_1$, . . . 104$_n$. In this manner, the measuring unit 202 can be protected in the event of an increase in the number of users. In particular, the processor (reference 112 in FIG. 1) provided at the system 102 may be used to handle load increases or decreases. In one embodiment, in the event of a communication failure, the server 110 may further temporarily save data that is to be exchanged from a sender (e.g. the user device 104$_1$) to a recipient (e.g. the measuring unit 202). Once communication is re-established, the data is then sent to the recipient.

Figure 5B:
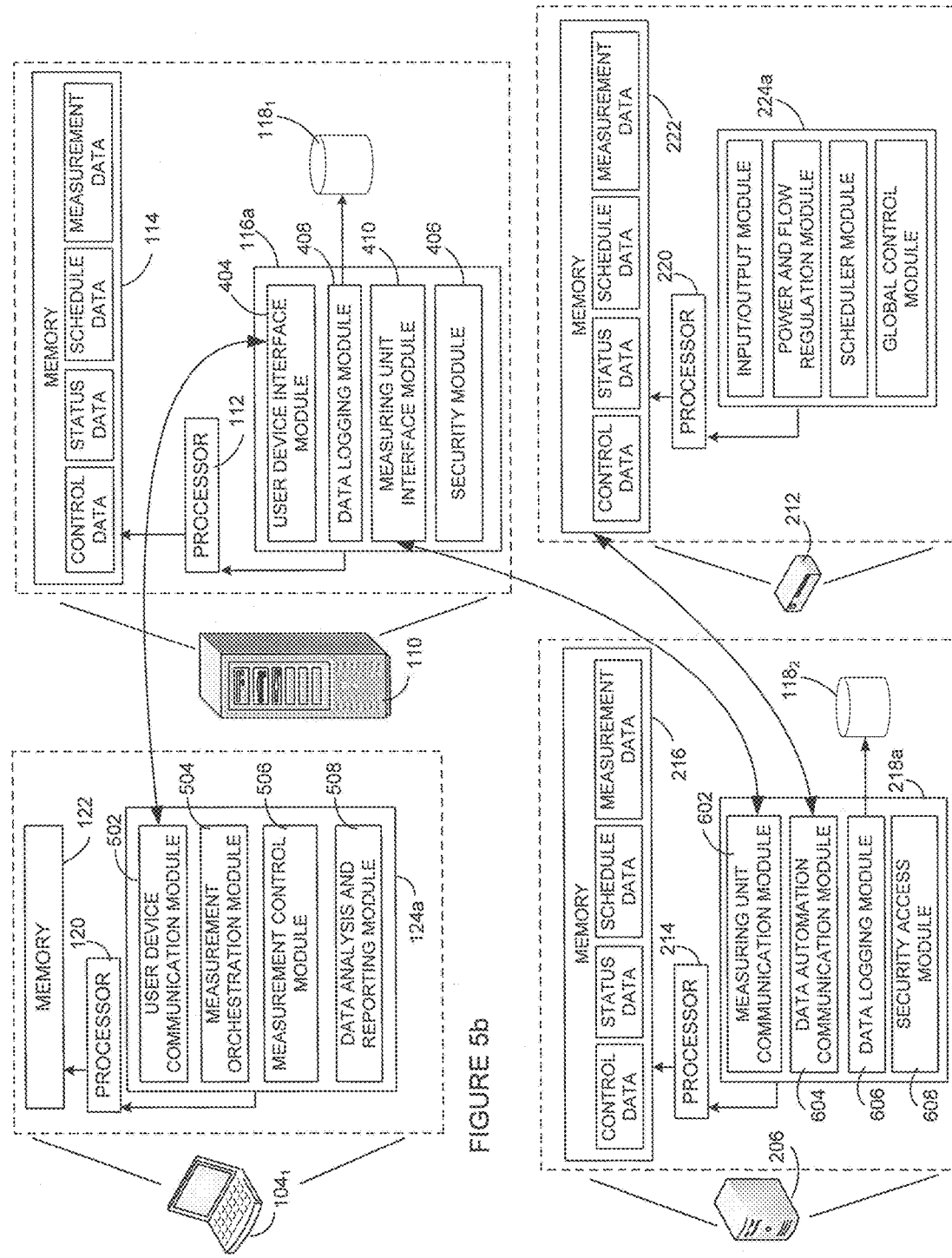

Referring now to FIG. 5b, access to the system (reference 102 in FIG. 1) may be effected by a user launching an application downloaded on their device 104$_1$, as discussed above, or accessing a website associated with the system 102. The user may then be required to log in or otherwise gain access to the system 102 using a unique identifier, e.g. username and password, associated with an account the user would have been provided with upon registering with the system 102. The identifier may be stored in the memory (reference 116 in FIG. 1) and/or databases (reference 118 in FIG. 1) and may be used by the security module 406 to verify the identity of the user when the latter attempts to access the system 102. The identifier may also be used to determine the user's access rights. Indeed, upon registering with the system 102, each user may be assigned a specific access level in accordance with his/her role.

For instance, a user having an administrative role may be provided with full access rights allowing him/her to manage other users of the system 102. An administrative user may also be allowed sufficient access rights to specify characteristics of the measuring unit 202 and any other relevant data needed for testing purposes (e.g. dimensions of boreholes, not shown, used in the geothermal drilling process). An administrative user may further be authorized to configure the memory 116 and/or databases 118 to indicate where (at the system 102) testing data is to be stored and which user can have access to the stored data. A user in charge of controlling the conductivity testing may be provided with access rights allowing him/her to initiate or tear down tests, view testing data, specify the testing workflow (e.g. automated tasks, conditions to move from one task to the next, timeframe, power level, fluid flow rate), as well as perform any other relevant actions required during testing. A user in charge of test reports may be provided with access rights allowing him/her to access reporting data and reporting functionalities throughout the testing process. It should be understood that roles may be defined according to the functionalities of the system 102 and that a same user may have a plurality of roles.

User requests, e.g. remote requests to initiate or teardown testing, monitor or otherwise control an undergoing test, retrieve and analyze testing data, and the like, are input by a user by means of his/her device 104$_1$. As known to those skilled in the art, a user may input requests using a suitable input device, such as a keyboard, mouse, touchscreen, or the like, provided on the device 104$_1$. The requests are then sent via the user device communication module 502 to the system 102 where they are received at the user device interface module 404. As discussed above, requests from several users may be received at the system 102 at any given time with all requests from different devices as in 104$_1$, . . . 104$_n$ being illustratively received at the same user device interface module 404.

The user device interface module 404 may then generate an authentication message, which may be indicative of a request to authorize the user access to the system 102. The authentication message may then be sent (e.g. via the transport and intermediation module, reference 402 in FIG. 4a, omitted in FIG. 5b for sake of clarity) to the security module 406. In order to authenticate the user, the security module 406, upon receiving the authentication message, retrieves from the memory 114 and/or databases 118 the stored identifier associated with the user's account. The security module 406 may then compare the stored identifier with user identification data provided in the received authentication message.

If the stored identifier does not match the received identification data, the user is not authenticated and the security module 406 may generate a message to that effect. This message may be transmitted to the user device interface module 404 (e.g. through the transport and intermediation module 402). Otherwise, the user is successfully authenticated and the security module 406 further retrieves from the user account stored in the memory 114 and/or databases 118 data indicating the access rights for the user in question. The security module 406 may then determine from the retrieved data whether the user is authorized to place the received request. If this is not the case, a message to that effect is generated by the security module 406 for transmission to the user device interface module 404. Otherwise, the security module 406 authorizes the user to access the system 102 as per the received request and generates a message to that effect. The messages generated by the security module 406 and received at the user device interface module 404 (e.g. through the transport and intermediation module 402) are then formatted for transmission to and rendering on the user's device 104. In one embodiment, once the user has been authenticated and his/her access rights granted, the user may wish to conduct, e.g. initiate, testing for a given measuring unit as in 202. For this purpose, the user may select a corresponding icon or other suitable selection/manipulation means presented (e.g. by the measurement orchestration module 504) on a suitable output device, e.g. a screen, provided on their device 104$_1$. Selection may be performed using an input device, such as a touchscreen, a mouse, or the like (not shown), of the device 104$_1$. The user may further input into the system information (e.g. a start date/time and end/date time for the testing sequence, a number of steps for the testing sequence, a power level for each step, a duration of each step, and the like) in order to program the testing sequence to be performed. For example, a programmed sequence may indicate that it is desirable for the testing to being at 6 pm, for the hydraulic system 204 to operate at zero power for the first four (4) hours of the testing sequence (first step), then at 15 W (second step), then at 20 W starting twenty-four (24) hours after initiation of the test until 3 am the following day, then for measurement data to be acquired. Once the sequence has been fully programmed, the user may further input (e.g. via the measurement control module 506) a command indicating that it is now desirable for the programmed test sequence to be started, i.e. transmitted to the selected measuring unit 202 and executed at the hydraulic system (reference 204 in FIG. 2). In one embodiment, the user may no longer make changes to the request and/or command data submitted to the system 102 once the testing sequence has started (e.g. in execution mode). The data input by the user into the system 102 is then illustratively transmitted to the system 102 via the user device communication module 502 and received as order data at the user device interface module 404.

Upon receiving the signal, the user device interface module 404 may then generate a corresponding request message indicating that testing is to be conducted at the measuring unit 202. The request message may further indicate the type of testing to be performed, the duration and/or timing thereof, as well as any other relevant information provided by the user. The request message is then transmitted in real-time via the measuring unit interface module 410 to the measuring unit's computer 206 where it is received at the measuring unit communication module 602. The request message may further be stored by the data logging module 408 in a database $118_1$ as history data that may be subsequently retrieved for tracking and analysis purposes or the like.

At the measuring unit 202, upon receiving the request message, the latter is transmitted to a security access module 608 that may be used for performing additional authentication and access authorization verifications. The data automation communication module 604 may then send the request message to the control unit 212 where it is written into the memory 222 as control data. The request message is further stored by the data logging module 606 in a database $118_2$ of the measuring unit 202 as history data that may be subsequently retrieved for tracking and analysis purposes or the like. The data logging module 606 may further store various messages and other measurement data transiting through the system 102. For instance, the data logging module 606 may be used to keep track of testing being currently carried out or having been carried out in the past as well as record any incidents that may have occurred during the testing process. The data logging module 606 may further be used to store user data, e.g. username, password, and authorization level, associated with a user's account created upon the user accessing the system 102. The data logging module 606 may also be used to store measuring unit data, e.g. an identification of each one of the measuring units as in 202 on which testing is to be performed. The measuring unit data may be provided by an administrative user accessing the system 102.

Figure 5C:
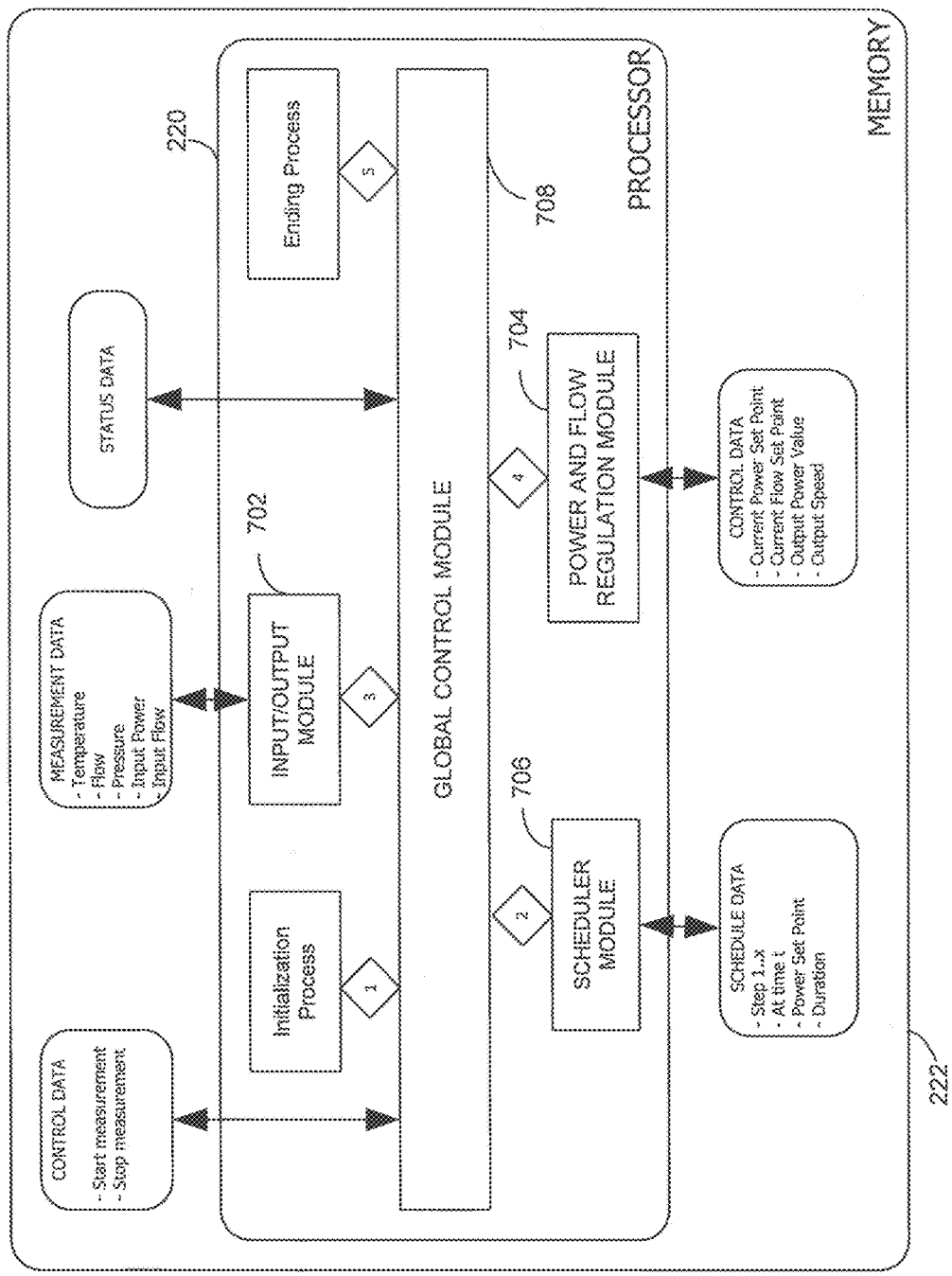
FIG. 5c is a schematic diagram of an application running on the processor of the control unit of FIG. 5b.

Referring now to FIG. 5c in addition to FIG. 5b, the control unit 212 may periodically access the memory 222 to determine whether control data (e.g. a command to start measurement and data related to a programmed testing sequence) has been received from the computer 206 (configuration mode of operation). Once it is determined that commands to perform a testing sequence have been received, the control unit 212 may first initialize internal variables stored in the memory 222 during an initialization process. The control unit 212 may then retrieve and read from the memory 222 the commands to execute the testing sequence (execution mode). For this purpose, the global control module 708 may orchestrate execution of the testing sequence. In particular, the global control module 708 may loop at a predetermined time interval, e.g. every 8-10 ms, to access the memory 222 and read the control data and/or measurement data received from the sensors (reference 213 in FIG. 2) and stored in the memory 222 via the input/output module 702. Upon reading the control data and/or the measurement data, the control unit 212, and more particularly the global control module 708, may then accordingly determine which actions are to be taken.

For instance, the global control module 708 may determine from the control data and/or from measurement data that a command to start a testing sequence has been received, that the hydraulic system 204 is currently performing the testing sequence and measurements are being acquired, that the duration of the testing sequence has not been exceeded (i.e. the testing is not completed), that the measurement data has been updated, or that the testing sequence is completed. In one embodiment, once the global control module 708 determines that a command to start a testing sequence has been received, the global control module 708 may then communicate with the scheduler module 706. The scheduler module 706 may then interpret the user's request and define a sequence of automated steps (i.e. a workflow) to be performed for effecting the geothermal conductivity testing as per the user's request. For this purpose, the scheduler module 706 illustratively takes into account the status of the hydraulic system's components. For instance, the testing workflow may be determined as a function of the opening and closing of the valves of the hydraulic system (reference 204 of FIG. 3), the activation, deactivation, increase, or decrease in power supplied to the hydraulic system 204, as well as the activation, deactivation, increase, or decrease in the operation of the pump (reference 306 in FIG. 3). In defining the sequence (e.g. order, timing) of testing steps, the scheduler module 706 may further take into account any notifications or authorizations received from the user and indicative of when to pass from one sequence to the next. The notifications may also indicate cases where control of an undergoing test is to be transferred from a remote user to a user positioned on site, e.g. at the data collection system $108_1$, for performing the tests on-site. The scheduler module 706 may then generate schedule data that is stored in the memory 222 and may include, but is not limited to, a number of steps, start time(s), power set point, flow set point, and duration of each step of the testing sequence.

The scheduler module 706 may then generate, on the basis of the schedule data, control signals (comprising instructions to cause acquisition of measurement) for output to the components of the hydraulic system 204. The control signals may be output at each step of the testing sequence to cause the sequence to be executed as programmed. For instance, the scheduler module 706 may, upon determining the desired pump speed, as indicated in the received control data, generate a first control signal to cause the pump to be activated and operated at the desired speed at the starting time indicated in the control data. The scheduler module 706 may subsequently determine from the control data that a given step has been reached in the testing sequence and that the boiler is to be activated with a given power level at that step. The scheduler module 706 may then output a second control signal to cause the boiler to be activated at the desired power level. The scheduler module 706 may thus periodically generate control signals to indicate the test steps to be performed, a sequence of the steps, and any other relevant information. The signals, upon being received at the component(s) of the hydraulic system 204, may be executed to perform the indicated testing.

In one embodiment, the scheduler module 706 may be used to prevent conflicts between user requests. In particular, a user having initiated a test using the system 102 may wish to interrupt the sequence of automated steps being carried out as a result of the test being launched and may wish to take control of the test manually. The scheduler module 706 may therefore define a set of rules indicative of the conditions in which an automated test may be interrupted or control of the test may be switched from automated to manual, or vice versa. For instance, the measuring unit 202 may be currently performing a given testing step in accordance with a given test sequence. A request for performing another step may then be received from the user and upon receiving the request, the scheduler module 706 may determine that the automated testing sequence is underway, and more particularly the testing step being performed. This determination may be performed by retrieving the measurement data from the memory 114. The rules implemented by the scheduler module 706 may then indicate that the testing step is not to be interrupted until the end thereof. As such, the scheduler module 706 may generate an alert message indicating the automated step being performed and providing an estimate of the time remaining until the testing step ends and the user can manually take control of the test. Once the testing step in question has ended, the scheduler module 706 may generate a control signal indicating that the automated test sequence is to be interrupted, thereby enabling the user to manually control the testing.

It should be understood that the scheduler module 706 may manage other types of conflicts. For instance, the logic implemented by the scheduler module 706 may ensure that a user of a remote device 104 does not operate a given test at the same time as a local user. Also, the logic implemented by the scheduler module 706 may prevent a user controlling a test manually from inputting successive test requests that may be in conflict with one another. In one embodiment, a user may indeed input a first request for a first testing step to be performed followed by a second request for the same or a second testing step to be performed. If the first request has not yet been executed, i.e. the first testing step has not been performed at the measuring unit 202, the scheduler module 706 may cause an alert message to be generated, the alert message indicating that the first request is yet to be executed. The scheduler module 706 may further prevent the second request from being routed towards the hydraulic system components until the first request has been executed.

The scheduler module 706 may also detect emergencies, such as when the level of a given operating parameter of the hydraulic system (reference 204 in FIG. 3), e.g. a pressure level, is above a predetermined threshold. Once the emergency is detected, the scheduler module 706 may generate a control signal to cause the shutdown of components of the hydraulic system 204, such as the pump 306 and/or the boiler 308. The scheduler module 706 may further generate an alert message accordingly for output (via the system 102) to the user device 104$_1$.

During execution of the testing sequence, measurement data is then received at the input/output module 702. The power and flow regulation module 704 may then compare the power and/or flow measurements received at the input/output module 702 to the power and/or flow set points stored in memory 222. If the power and/or flow measurements differ from the power and/or flow set points, the power and flow regulation module 704 may then determine an adjustment (increase or decrease) necessary to bring the current power and/or flow towards the corresponding set point. The power and flow regulation module 704 may then generate control data accordingly and store the data in the memory 222. The global control module 708, upon periodically accessing the memory 222, may determine the need for adjustment of the power and/or flow and output a control signal accordingly for transmission to the components of the hydraulic system 204 via the input/output module 702. The power and flow regulation module 704 may then subsequently monitor the input power and/or flow to ensure that the desired set points have been reached. In one embodiment, the power and flow regulation module 704 may monitor the power and/or flow values to ensure that the latter remain stable.

During execution of the testing sequence, the global control module 708 may further access the memory 222 to store therein status data indicative of a current execution status (e.g. test successfully initiated, test undergoing, test ended, test failed due to problems, such as issues with testing equipment, communication failures, sudden unjustified changes) of the testing. Once it is determined from the status data whether the testing initiation was successful or failed, a corresponding status message may be generated for rendering on an output device (e.g. a screen) provided with the user device as in 104$_1$. In particular, if the testing was successfully initiated, a confirmation message may be output. If the launch of the testing was not successful, an alert message identifying the problem having caused failure of the test may alternatively be output. Data may also be communicated to the device 104$_1$ via email, Short Message Service (SMS), Multimedia Messaging Service (MMS), instant messaging (IM), or other suitable communication means known to those skilled in the art. In this manner, the user having triggered the testing on the measuring unit 202 can be promptly notified of the outcome of their request.

When the global control module 708 determines from the control data and/or the measurement data that the testing sequence has been completed (e.g. a duration of the sequence has been reached), an ending process may be performed. Variables stored in the memory 222 may indeed be reinitialized after completion of the testing sequence and the global control module 708 will keep looping at the predetermined time interval to check whether a command to start a new testing sequence is received. If this is the case, the process described above with reference to FIG. 5*c* may be repeated.

Throughout the process, e.g. during execution of the testing sequence, all data stored in the memory 222 is periodically updated and can be periodically accessed and read by the TRT computer 206, and more particularly by the data automation communication module 604. The computer 206 may then duplicate the data stored in the control device's memory 222 and store the duplicate data in its own memory 216. As a result, the memory 216 illustratively comprises at any given time an up-to-date copy of the data stored in the control device's memory 222. Upon the TRT computer 206 determining (e.g. from the status data) that the testing sequence has been completed, the TRT computer 206 may then transmit to the system 102 the measurement data collected by the hydraulic system 204. It should be understood that the measurement data may alternatively be transmitted to the system 102 periodically so that the user accessing the system 102 may access an up-to-date copy of the measurement data in real-time. Indeed, in one embodiment, after a test has been initiated and while the test sequence is being carried out, the user may be periodically provided access to the duplicate data. The user may therefore follow the undergoing testing in real-time, view and analyze testing results upon completion of the testing sequence, and access reports, as will be discussed further below.

For this purpose, the measuring unit communication module 602 may communicate with the measuring unit interface module 410, which accesses the memory 216 to obtain a copy of the data stored therein. It should be understood that measurement data from several measuring units as in 202 may be accessed via a same measuring unit interface module 410 at any given time. Upon the data stored in the memory 216 of the measuring unit 202 being accessed and duplicated in real-time, the duplicated data may then be stored in the memory 114 of the server 110. It should be understood that, if several measuring units as in 202 are being accessed to obtain measurement data therefrom, duplicate data may be stored in the memory (e.g. in different memory blocks) for each one of the measuring units as in 202. The server 110 may then communicate (via the user device interface module 404 and the user device communication module 502) with the at least one user device as in $104_1$ having requested the test. In this manner, the user device $104_1$ may be provided access to the duplicate data stored in the memory 114 (for the measuring unit 202 the user is authorized to have access to) for rendering on the device $104_1$. User requests, responses thereto, status updates, messages, and other relevant information exchanged during use of the system 102 may also be stored in the memory 114 and/or databases $118_1$ for access by the user for control or analysis purposes.

In one embodiment, access to testing data, e.g. duplicate data from undergoing or previous tests stored in the memory 114 and/or databases $118_1$ may be provided to users through the data access module (reference 412 in FIG. 4a, omitted from FIG. 5b for the sake of clarity). The data access module 412 may indeed be used to enable users to have access to the measurement data obtained from the data collection system $108_1$ (and other data collection systems $108_2, \ldots, 108_n$, where applicable). For this purpose, the data access module 412 may dynamically manage access to the data for each one of the users of the system 102. For instance, access requests received at the user device interface module 404 may be communicated to the transport and intermediation module (reference 402 in FIG. 4a) and retrieved therefrom by the data access module 412. The data access module 412 may then prioritize the requests so as to prevent congestion of the system 102. In particular, the data access module 412 may prioritize the requests in a queue according to the access rights of the corresponding users. The data access module 412 may then manage access to the requested data, in order of priority. The data access module 412 may further store in the memory 116 and/or databases 118 frequently accessed data transiting through the transport and intermediation module 402. In this manner, prompt access to requested data can be ensured.

In one embodiment, upon the user being provided access to the data stored in the memory 114, the data analysis and reporting module 508 may retrieve from the memory 114 the measurement data for a given measuring unit 202. Although illustrated as integrated in the user device $104_1$, it should be understood that the data analysis and reporting module 508 may be comprised in the system 102. The data analysis and reporting module 508 may then process and analyze the measurement data and generate therefrom analytics, such as summaries, tables, charts, and other reporting data indicative of the thermal properties determined during the thermal response test(s). For the purpose of generating reports, the data analysis and reporting module 508 may also retrieve from the memory 114 and/or the database $118_1$ data other than measurement data that may be stored therein by the processor 112 while the system (reference 100 in FIG. 1) is in use. For instance, the data analysis and reporting module 508 may access and retrieve data indicating the time and date user requests have been initiated, a device(s) (if other than the device $104_1$) having requested given test(s), the measuring unit as in 202 having performed the test, and the user devices having accessed the data stored in the memory 114 and/or the database $118_1$. Reporting data may then be produced in any suitable format, such as numerical, graphical, or the like, in accordance with a request from the user. The reporting data may then be rendered on a suitable output means of the user device $104_1$.

Figure 6:
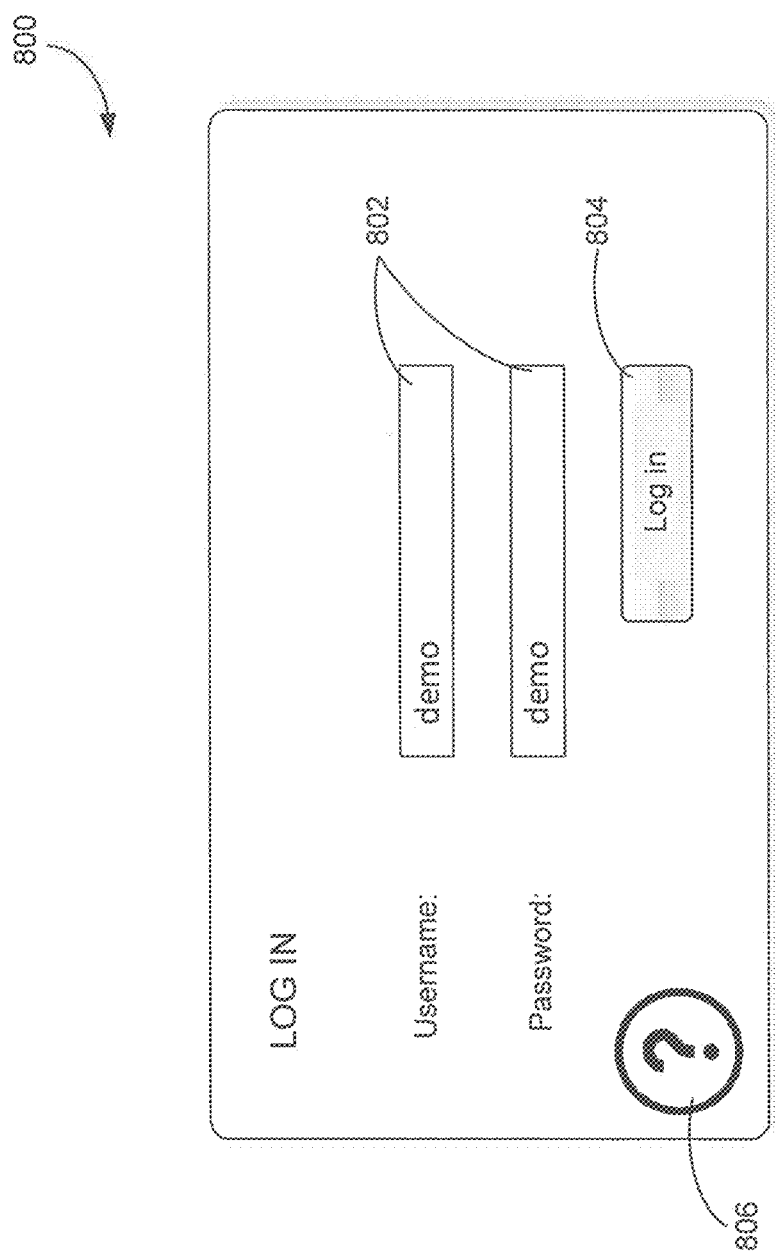
FIG. 6 is a screen capture of a log in screen in accordance with an illustrative embodiment of the present invention.

FIG. 6 illustrates a screen capture of a log in screen 800 enabling the user to be provided access to the system (reference 102 of FIG. 1) for initiating or overseeing a geothermal conductivity test. User interface elements 802, such as text boxes allowing for free text to be entered, are provided to enable the user to enter the unique identifier, e.g. the username and password, associated with his/her account with the system 102. After entering the data, the user may select a "Log in" option 804 to trigger the authentication and be subsequently provided access to the system 102. The screen 800 further comprises a "help" option 806, which when selected, provides guidance to the user. Any option discussed herein may be selected by the user via a suitable input device, such as a touchscreen, a keyboard, a mouse, or the like (not shown) provided with the device 104. Also, the option may comprise a variety of selection/manipulation means, such as icons, tabs, buttons, and the like.

Figure 7:
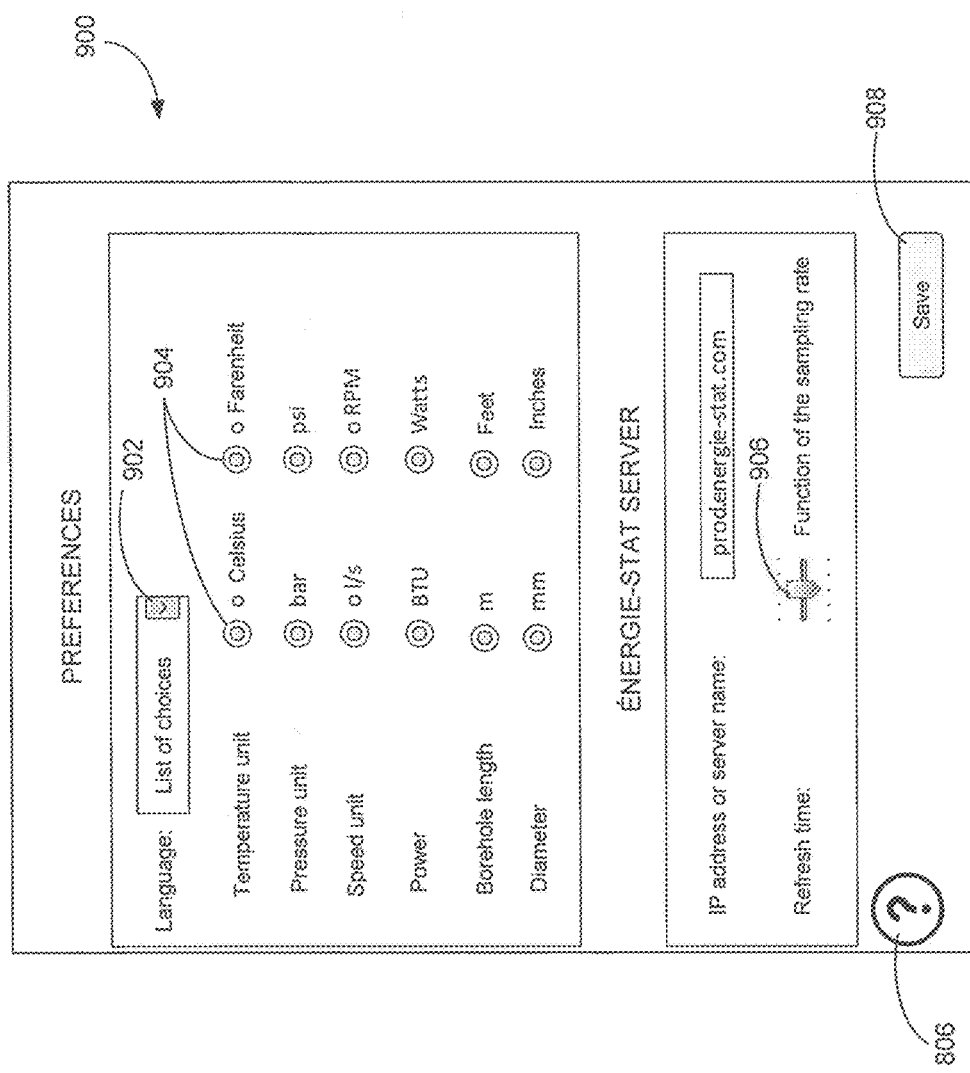
FIG. 7 is a screen capture of a preferences screen in accordance with an illustrative embodiment of the present invention.

As shown in FIG. 7, upon successful authentication of the user, a preferences screen 900 may be presented on the device 104 to enable the user to specify testing preferences. For this purpose, the screen 900 comprises a plurality of control elements or options presenting the various preferences the user may choose from. A first option 902, illustratively a drop-down menu, enables the user to select the language to be used. Upon being selected, a plurality of options as in 904 further enable the user to specify testing information, such as measuring units for various operating parameters (e.g. temperature, pressure, speed, and power) or for dimensions (e.g. length and diameter) of drilled boreholes. By selecting a corresponding option 906 on the screen 900, the user may also specify the refresh time for testing data presented on the device 104. Any input entered at the screen 900 may be saved by selecting a corresponding option 908.

Figure 8:
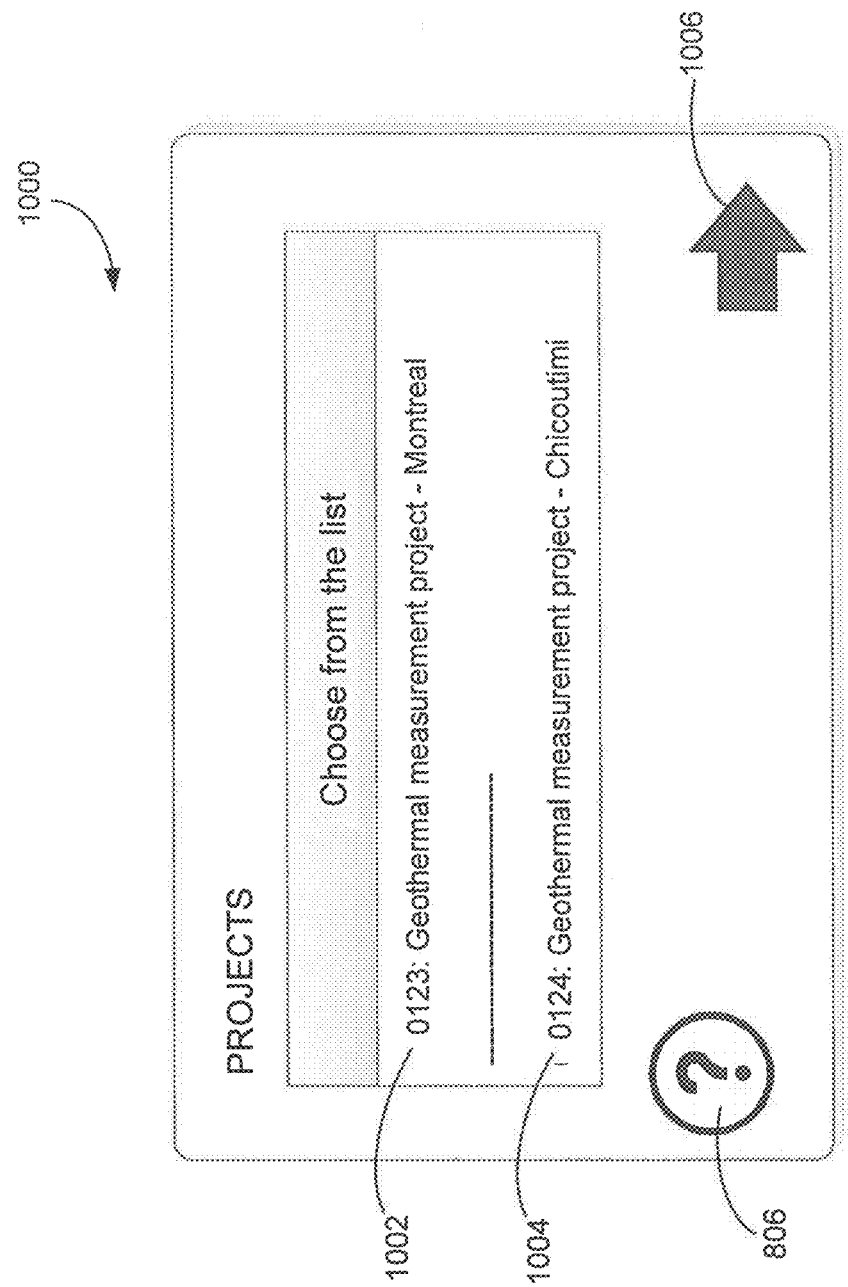
FIG. 8 is a screen capture of a project selection screen in accordance with an illustrative embodiment of the present invention.

FIG. 8 illustrates a project selection screen 1000 that may be presented to the user so as to enable the latter to select a given one of a plurality of existing testing projects stored in the system 102. Indeed, a history of previous testing performed using the system 100 may be recorded and upon the user accessing the system 102 with their device 104, a list of previous testing projects may be presented on the screen 1000. Each one of the projects in the list may be associated with a corresponding option 1002, 1004, that may be selected by the user to choose the corresponding project and access details thereof. Once a project is selected, the user may be presented with a main project screen (reference 110 in FIG. 9). If the desired project cannot be found in the list presented on the screen 1000, the user may select a "next" option 1006 to be presented with a new screen (not shown) for inputting (e.g. manually entering) project information to create a new project record.

Figure 9:
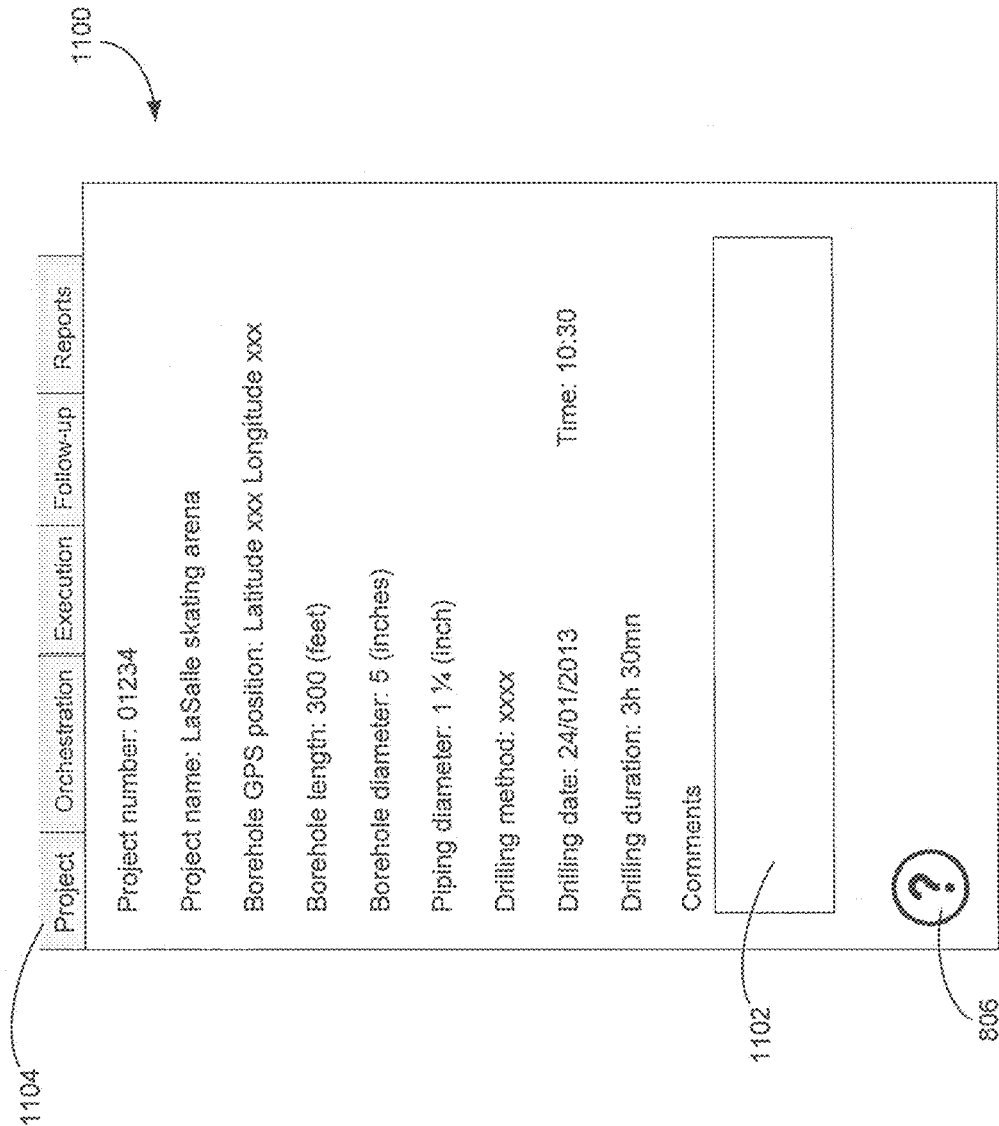
FIG. 9 is a screen capture of a main project screen in accordance with an illustrative embodiment of the present invention.

As illustrated in FIG. 9, the main project screen 1100 presents details related to the project at hand, such as a project name and number, a position, length, and diameter of the borehole, a diameter of piping used, a drilling method, and a testing date, time, and duration. The screen 1100 further provides the user with an interface element, such as a text box 1102, that enables comments about the project to be submitted, if any. The screen 1100 is illustratively displayed under a "Project" tab 1104. Additional tabs as in 1104, e.g. an "Orchestration" tab, an "Execution" tab, a "Follow-up" tab, and a "Reports" tab may be provided to allow (e.g. upon being selected) access to various screens, as will be discussed further below.

Figure 10:
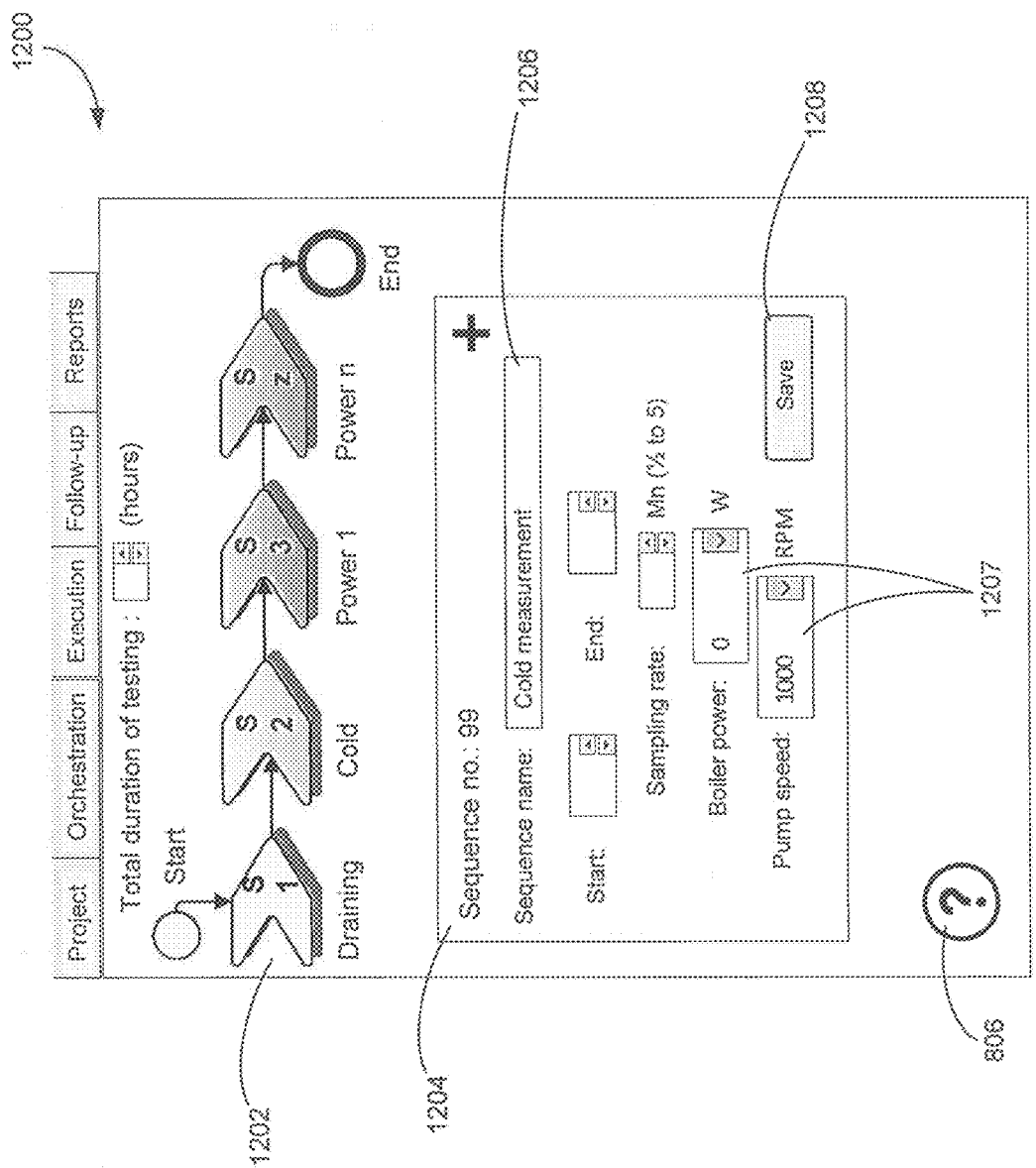
FIG. 10 is a screen capture of an orchestration screen in accordance with an illustrative embodiment of the present invention.

FIG. 10 illustrates an orchestration screen 1200 (illustratively displayed under the "Orchestration" tab) presenting orchestration details for the project at hand. The orchestration screen 1200 presents in a suitable, e.g. graphical, format the workflow 1202 of a testing sequence to be performed. A "Sequence" box 1204 further presents details about one or more steps in the testing sequence. Using interface elements, such as text box 1206, drop-down menus 1207, and the like, the user may specify or modify parameters of the testing step. For instance, the user may specify the name, duration, start and end time of the test, or any other relevant information. In one embodiment, each test procedure may have a duration of 24 hours. In other embodiments, test are run for 48 hours. It should be understood that each test procedure may last more or less time. Once the information has been entered or modified, it can be saved by selecting a corresponding option 1208.

Figure 11:
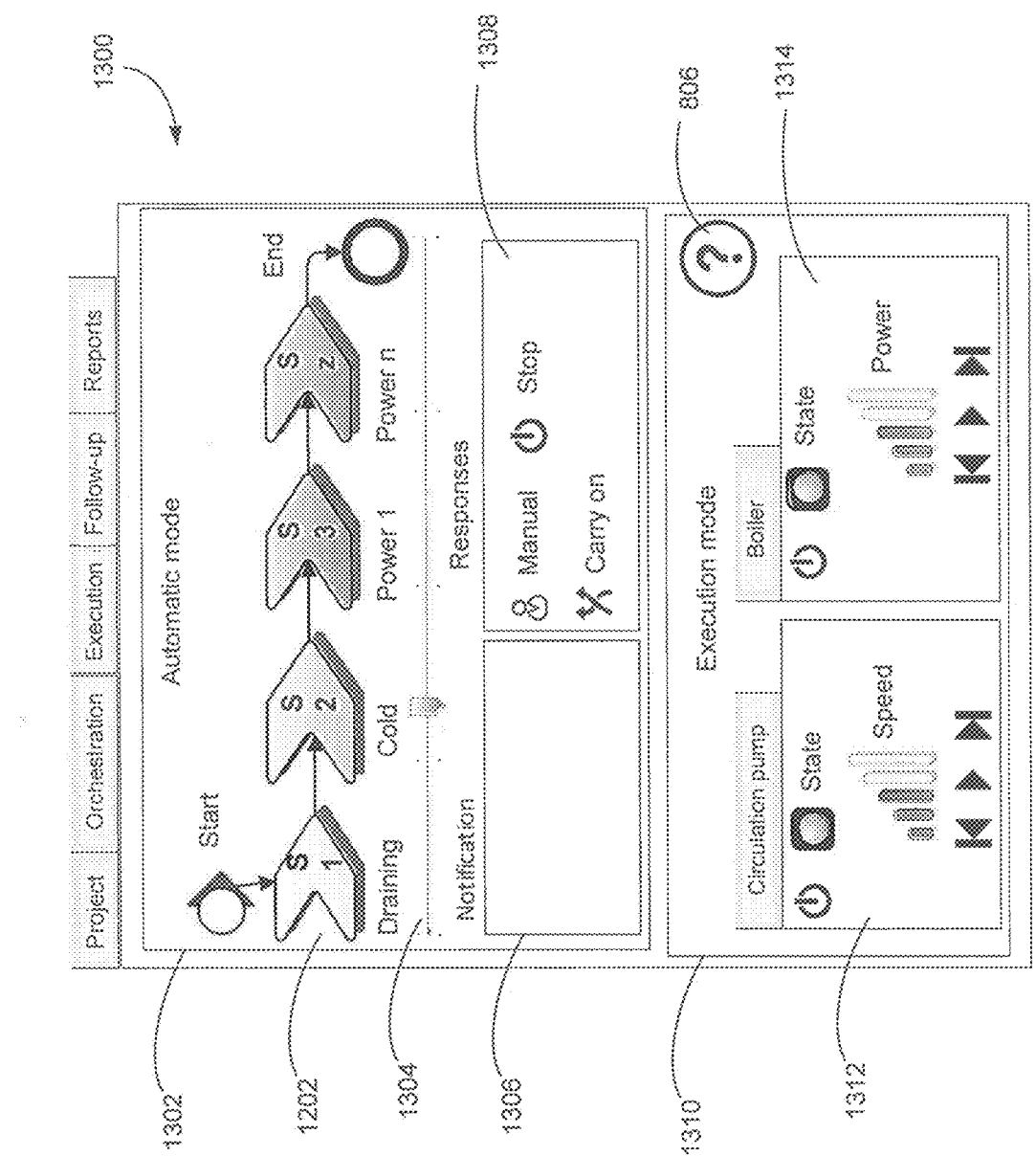
FIG. 11 is a screen capture of an execution screen in accordance with an illustrative embodiment of the present invention.

An execution screen 1300 (illustratively displayed under the "Execution" tab) can then be presented to the user as shown in FIG. 11. The execution screen 1300 indicates the progress of an undergoing test. For this purpose, an "Automatic mode" box 1302 is provided, which displays the testing workflow 1202, e.g. in a graphical format. A visual indicator 1304 is further provided adjacent the workflow 1202 to indicate which step of the workflow 1202 is currently being carried out. Notifications, such as alerts indicating failure of the testing step due to an issue with the testing equipment, may be displayed in a "Notification" box 1306. A "Responses" box 1308 is further provided to present possible responses to a given notification. For this purpose, several control elements (not shown) each associated with a given response may be presented in the "Responses" box 1308. The user may then select the appropriate control element in order to cause the corresponding response to occur. For example, the user may select a first control element to indicate that a manual response is to be provided to the notification (e.g. by an on-site technician manually correcting the problem with the equipment). The user may alternatively select a second control element to cause the test to be torn down or a third control element to cause the test to carry on. The execution screen 1300 may also comprise an "Execution mode" box 1310 indicating the state of a controlled device, e.g. the circulation pump or the boiler (respectively references 306 and 308 in FIG. 3). As shown in FIG. 11, a first area 1312 of the screen 1300 may provide information, e.g. on/off state and speed level information, about the pump 306. A second area 1314 of the screen 1300 may further provide information, e.g. on/off state and power level information, about the boiler 308.

Figure 12:
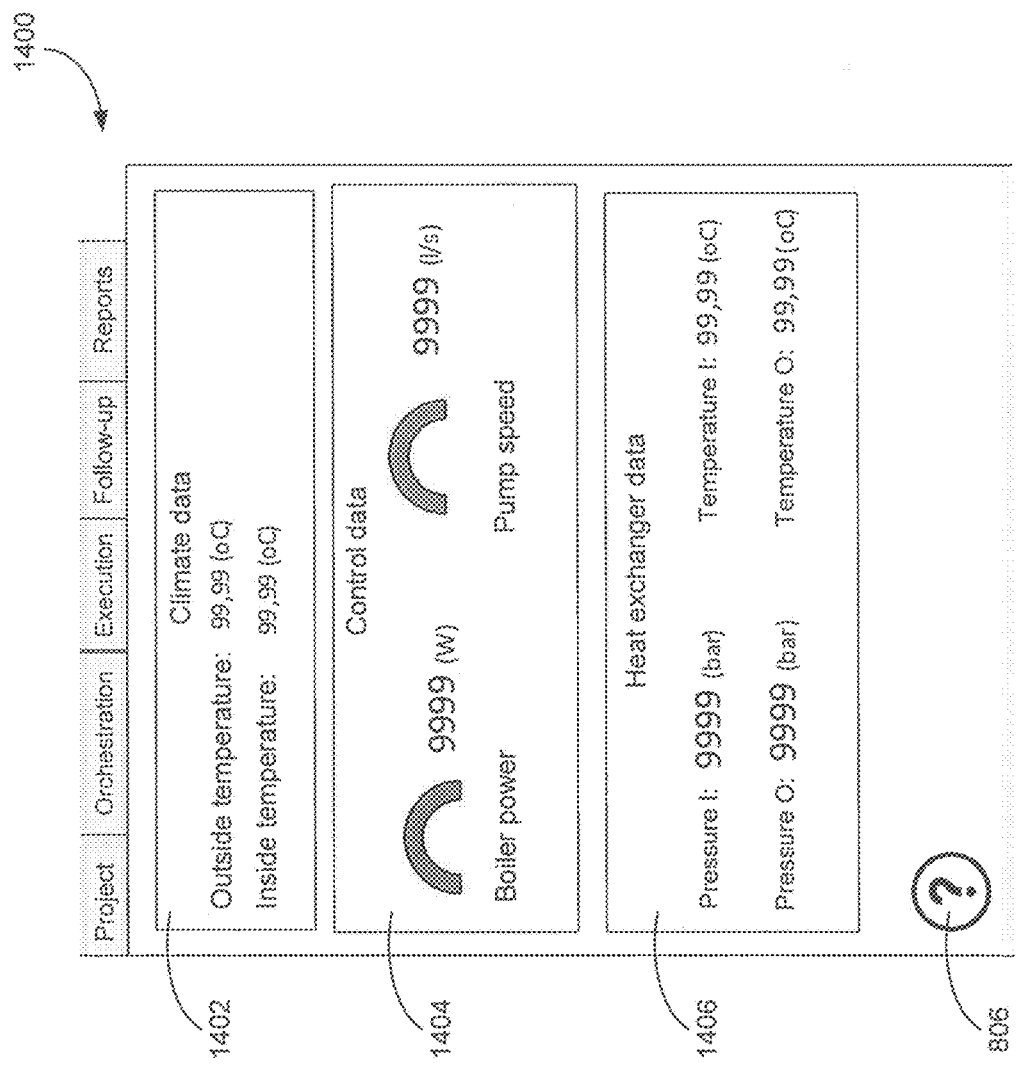
FIG. 12 is a screen capture of a follow-up screen in accordance with an illustrative embodiment of the present invention.

Referring now to FIG. 12, a follow-up screen 1400 (illustratively displayed under the "Follow-up" tab) may further be presented to the user to display testing parameters. In one embodiment, the follow-up screen 1400 comprises a first area 1402 presenting temperature information, as measured outside and inside the hydraulic system (reference 204 in FIG. 3). A second area 1404 of the screen 1400 further presents control data, such as measurements of the current boiler power and pump speed. A third area 1406 of the screen 1400 presents pressure and temperature measurements for the geothermal heat exchanger (reference 302 in FIG. 3).

Figure 13A:
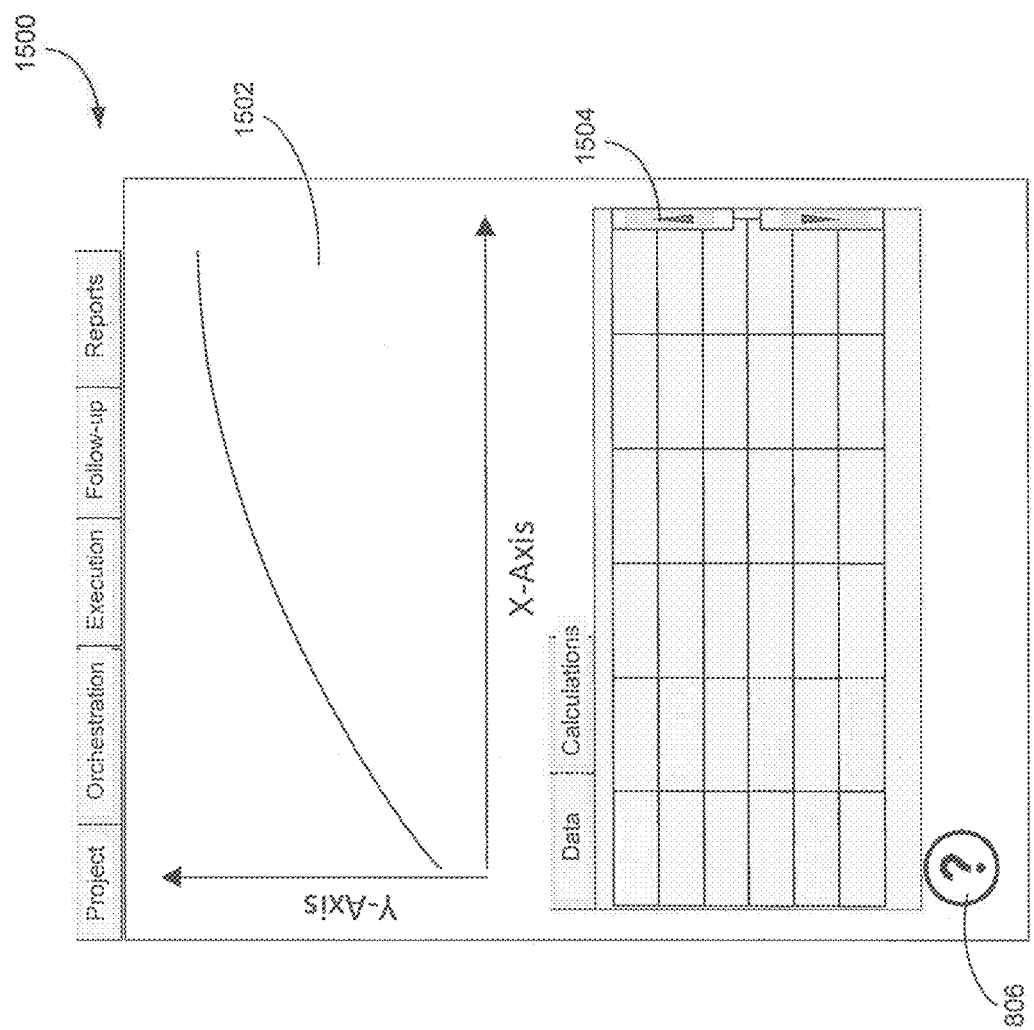
FIG. 13a is a screen capture of a reports screen in accordance with a first illustrative embodiment of the present invention.
Figure 13B:
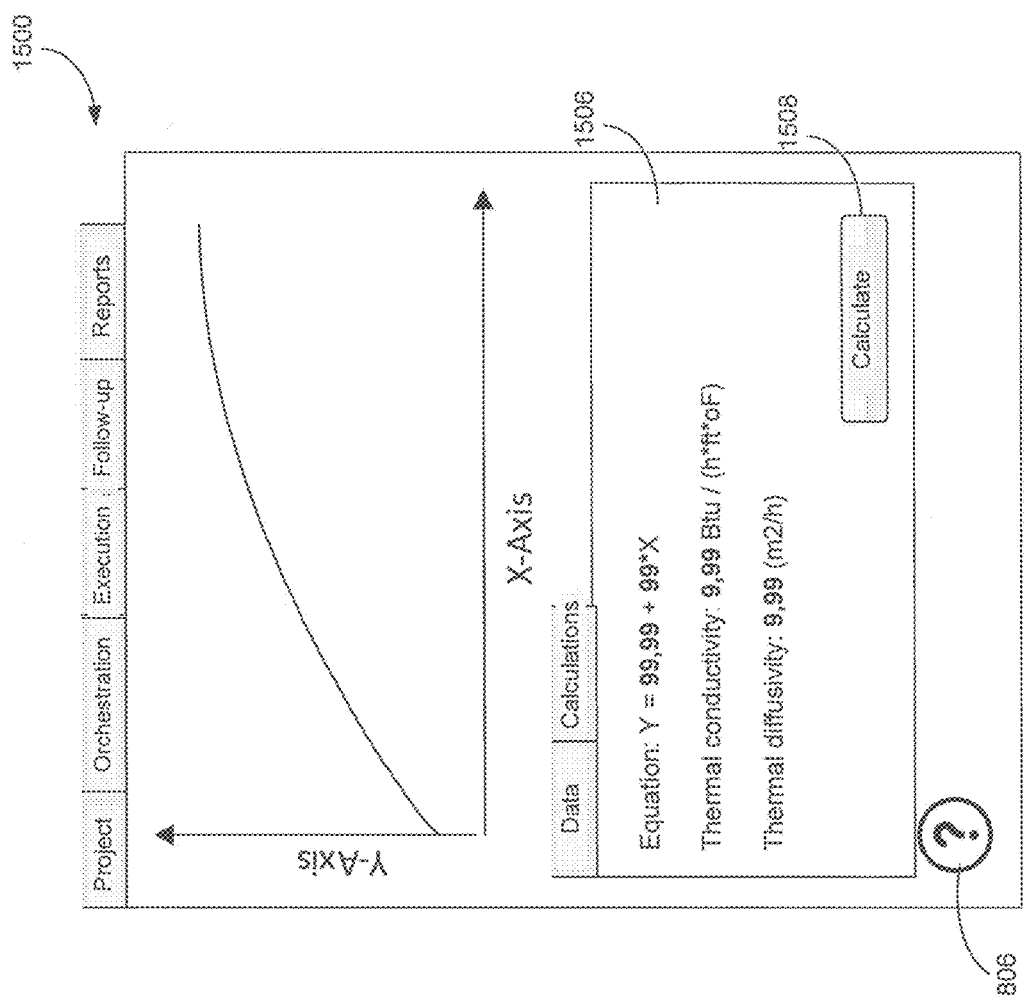
FIG. 13b is a screen capture of a reports screen in accordance with a second illustrative embodiment of the present invention.

Referring now to FIG. 13a and FIG. 13b, the user may further access a reports screen 1500 (illustratively displayed under the "Reports" tab) presenting testing results in a suitable format, such as a graphical or tabular format. For this purpose, the screen 1500 may comprise a graph area 1502 for presenting therein plots of the test results. The testing data may also be presented in a tabular format in a first area 1504 (see FIG. 12a). Calculations, and more particularly equations, used to compute the thermal properties, e.g. thermal conductivity, from the collected testing data may also be presented in a second area 1506 (see FIG. 13b). The user may proceed with the presented calculations upon selecting a corresponding "Calculate" option 1508 presented on the screen 1500. Although the equations shown in the second area 1506 of screen 1500 relate to equations used to compute thermal conductivity, it should be understood that other equations may apply when other thermal response tests, as discussed above, are performed.

Figure 14:
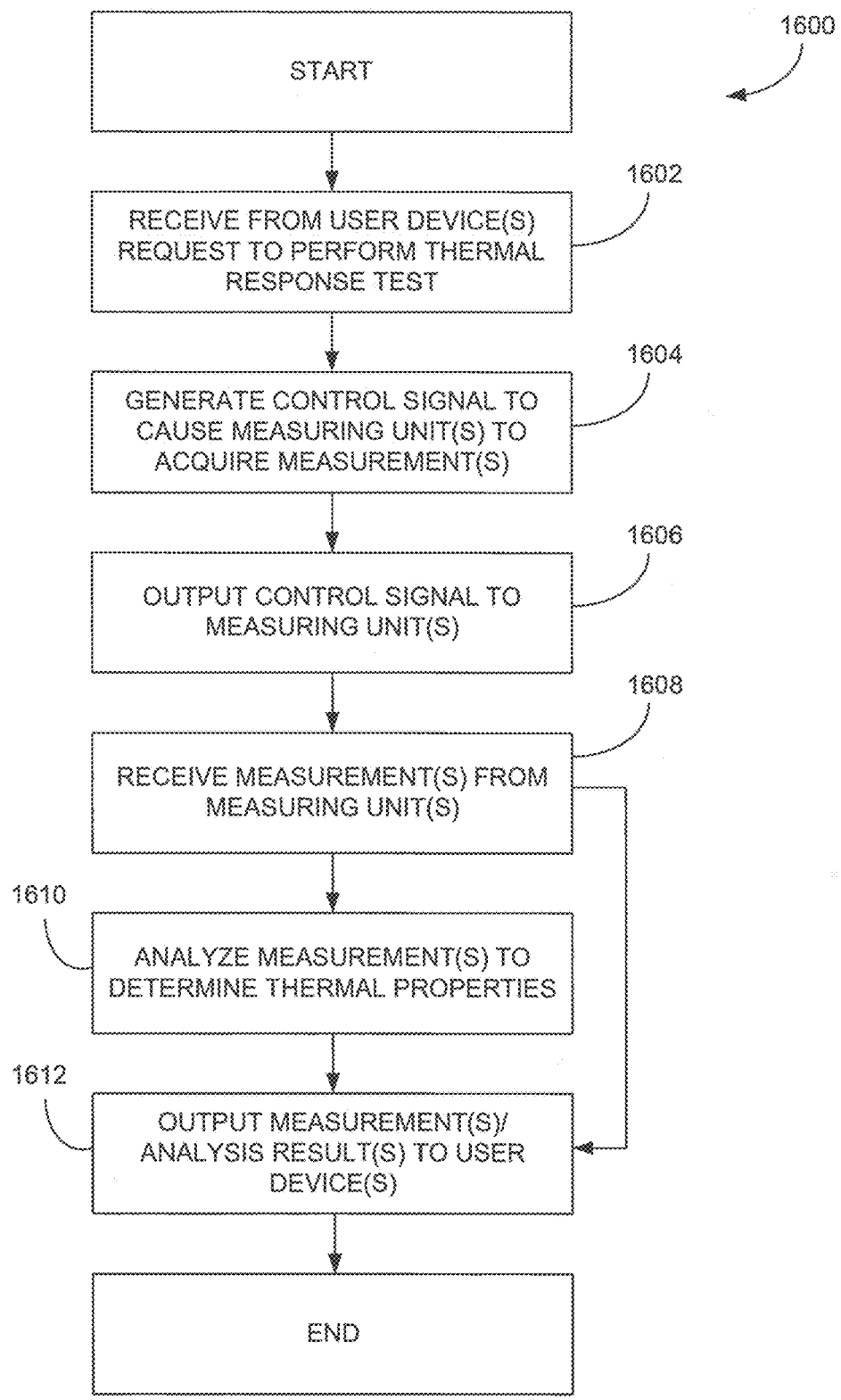
FIG. 14 is a flowchart of a method for performing a thermal response test in accordance with an illustrative embodiment of the present invention.

Referring now to FIG. 14, a method 1600 for performing a thermal response test will now be described. The method 1600 comprises receiving at step 1602 at least one request to perform a thermal response test from user device(s) (reference 104 in FIG. 1). A control signal is then generated at step 1604 to cause one or more measuring units (as in reference 202 in FIG. 2) to acquire one or more measurements for performing the test. The control signal is outputted at step 1606 to the measuring unit(s), which acquire(s) the measurement(s) accordingly. The one or more measurements are then received at step 1608 from the measuring unit(s). The measurement(s) may then be analyzed at step 1610 in order to determine the thermal properties of the medium being tested. The analysis results are then output at step 1612 to the user device 104 having requested the test to be conducted as well as to additional devices 104, if any, having requested access to test results. In one embodiment, the measurement(s) received at step 1608 may be output to the user device(s) directly at step 1612, without analysis.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. It should be noted that the present invention can be carried out as a method, can be embodied in a system, or on a computer readable medium. The embodiments of the invention described above are intended to be exemplary only. The scope of the invention is therefore intended to be limited solely by the scope of the appended claims.

The invention claimed is:

1. A system for performing a thermal response test for a medium, the system comprising:
a first processing unit;
at least one second processing unit remotely connected to the first processing unit; and
a control unit connected to the at least one second processing unit and to a hydraulic system configured to circulate a fluid through the medium, the hydraulic system comprising a pump configured to propel the fluid and a boiler configured to control a temperature of the fluid,
the control unit
receiving control data indicative of a request for the thermal response test to be performed,
defining a test sequence to be performed in response to the request,
controlling operation of at least one component of the hydraulic system to one of activate at least one of the pump and the boiler, deactivate the at least one of the pump and the boiler, and adjust an operating parameter of the at least one of the pump and the boiler in accordance with the test sequence, causing at least one sensing device provided at the hydraulic system to acquire, in accordance with the test sequence, at least one parameter of the fluid circulating through the medium, the at least one parameter indicative of a thermal property of the medium, and receiving from the hydraulic system measurement data comprising the at least one parameter, the at least one second processing unit configured to generate a duplicate of the measurement data in real-time, and the first processing unit configured to store a copy of the duplicate measurement data in a first memory in real-time for providing real-time access to up-to-date measurement data.

2. The system of claim 1, wherein the at least one second processing unit and the control unit are part of a mobile data collection unit.

3. The system of claim 1, wherein the first processing unit is configured to receive the control data comprising a selection of a given one of a plurality of data collection units each comprising the at least one second processing unit and the control unit.

4. The system of claim 1, wherein the first processing unit is configured to receive the control data indicative of a sequence for the test, the control data comprising at least one of a start time for the sequence, a start date for the sequence, a number of steps in the sequence, a power level for each step in the sequence, and a duration of each step in the sequence.

5. The system of claim 1, wherein the first processing unit is coupled to the first memory and is configured to receive a request signal comprising the control data and to store the received control data in the first memory.

6. The system of claim 5, wherein the first processing unit is configured to transmit the control data to the at least one second processing unit comprising duplicating the control data and accessing a second memory coupled to the at least one second processing unit for storing therein the duplicated control data.

7. The system of claim 6, wherein the at least one second processing unit is configured to transmit the received control data to the control unit comprising accessing a third memory coupled to the control unit and storing therein a copy of the duplicated control data.

8. The system of claim 7, wherein the control unit retrieves the copy of the duplicated control data from the third memory and schedules, based on the copy of the duplicated control data, an execution of a sequence of the test.

9. The system of claim 8, wherein the control unit stores the measurement data in the third memory.

10. The system of claim 9, wherein the at least one second processing unit is configured to access in real-time the third memory to retrieve therefrom the measurement data, and store the duplicate measurement data in the second memory.

11. The system of claim 10, wherein the first processing module is configured to access the second memory in real-time, and retrieve therefrom the duplicate measurement data.

12. The system of claim 1, wherein the first processing unit is configured to receive from at least one user device a request signal comprising the control data and to provide the at least one user device real-time access to the copy of the duplicate measurement data stored in the first memory.

13. A computer-implemented method for performing a thermal response test for a medium, the method comprising:

providing a first processing unit;

providing at least one second processing unit remotely connected to the first processing unit;

providing a control unit connected to the at least one second processing unit and to a hydraulic system configured to circulate a fluid through the medium, the hydraulic system comprising a pump configured to propel the fluid and a boiler configured to control a temperature of the fluid;

at the control unit, receiving control data indicative of a request for the thermal response test to be performed, defining a test sequence to be performed in response to the request, controlling operation of at least one component of the hydraulic system to one of activate at least one of the pump and the boiler, deactivate the at least one of the pump and the boiler, and adjust an operating parameter of the at least one of the pump and the boiler in accordance with the test sequence, causing at least one sensing device provided at the hydraulic system to acquire, in accordance with the test sequence, at least one parameter of the fluid circulating through the medium, the at least one parameter indicative of a thermal property of the medium, and receiving from the hydraulic system measurement data comprising the at least one parameter;

at the at least one second processing unit, generating a duplicate of the measurement data in real-time; and at the first processing unit, storing a copy of the duplicate measurement data in a first memory in real-time for providing real-time access to up-to-date measurement data.

14. The method of claim 13, wherein, at the first processing unit, the received control data is indicative of a sequence for the test and comprises at least one of a start time for the sequence, a start date for the sequence, a number of steps in the sequence, a power level for each step in the sequence, and a duration of each step in the sequence.

15. The method of claim 13, further comprising, at the first processing unit, storing the received control data in the first memory, duplicating the control data, and accessing a second memory coupled to the at least one second processing unit for storing therein the duplicated control data.

16. The method of claim 15, further comprising accessing, at the at least one second processing unit, a third memory coupled to the control unit and storing therein a copy of the duplicated control data.

17. The method of claim 16, further comprising, at the control unit, retrieving the copy of the duplicated control data from the third memory and scheduling, based on the copy of the duplicated control data, an execution of a sequence of the test sequence.

18. The method of claim 17, further comprising, at the at least one second processing unit, accessing in real-time the third memory to retrieve therefrom the measurement data, and storing the duplicate measurement data in the second memory.

19. The method of claim 13, further comprising, at the first processing unit, providing real-time access to the copy of the duplicate measurement data stored in the first memory to at least one user device from which a request signal comprising the control data is received.

20. A non-transitory computer readable medium having stored thereon program code executable by a processor for performing a thermal response test for a medium, the program code executable for:

providing a first processing unit;

providing at least one second processing unit remotely connected to the first processing unit;

providing a control unit connected to the at least one second processing unit and to a hydraulic system configured to circulate a fluid through the medium, the hydraulic system comprising a pump configured to propel the fluid and a boiler configured to control a temperature of the fluid;

at the control unit, receiving control data indicative of a request for the thermal response test to be performed, defining a test sequence to be performed in response to the request, controlling operation of at least one component of the hydraulic system to one of activate at least one of the pump and the boiler, deactivate the at least one of the pump and the boiler, and adjust an operating parameter of the at least one of the pump and the boiler in accordance with the test sequence, causing at least one sensing device provided at the hydraulic system to acquire, in accordance with the test sequence, at least one parameter of the fluid circulating through the medium, the at least one parameter indicative of a thermal property of the medium, and receiving from the hydraulic system measurement data comprising the at least one parameter;

at the at least one second processing unit, generating a duplicate of the measurement data in real-time; and at the first processing unit, storing a copy of the duplicate measurement data in the first memory in real-time for providing real-time access to up-to-date measurement data.

* * * * *